(12) United States Patent
Sexton et al.

(10) Patent No.: US 7,145,073 B2
(45) Date of Patent: Dec. 5, 2006

(54) ELECTRICAL WIRE AND METHOD OF FABRICATING THE ELECTRICAL WIRE

(75) Inventors: Robert J. Sexton, Hendersonville, TN (US); Fred Lane Martin, Knoxville, TN (US); Charles Alexander Garris, III, Hendersonville, TN (US)

(73) Assignee: Southwire Company, Carrollton, GA (US)

( * ) Notice: Subject to any disclaimer, the term of this patent is extended or adjusted under 35 U.S.C. 154(b) by 0 days.

(21) Appl. No.: 10/790,055

(22) Filed: Mar. 2, 2004

(65) Prior Publication Data

US 2005/0042942 A1 Feb. 24, 2005

Related U.S. Application Data

(60) Provisional application No. 60/500,350, filed on Sep. 5, 2003.

(51) Int. Cl.
*H01B 7/34* (2006.01)
*H01B 7/00* (2006.01)

(52) U.S. Cl. .................. 174/36; 174/110 R; 174/174; 174/113 R

(58) Field of Classification Search .................. 174/36, 174/110 R, 113 R, 117 F, 117 FF, 32
See application file for complete search history.

(56) References Cited

U.S. PATENT DOCUMENTS

| | | | |
|---|---|---|---|
| 2,200,776 A | 5/1940 | Hoover | |
| 3,079,458 A | 2/1963 | Hedstrom | |
| 3,168,617 A | 2/1965 | Richter | |
| 3,547,718 A * | 12/1970 | Herman | 156/55 |
| 3,960,622 A | 6/1976 | Hofling et al. | |
| 4,185,887 A | 1/1980 | Ferrentino | |
| 4,219,928 A * | 9/1980 | Kuo | 29/868 |
| 4,355,865 A | 10/1982 | Conrad et al. | |
| 4,401,361 A | 8/1983 | Slaughter | |
| 4,404,425 A | 9/1983 | Rich | |
| 4,407,065 A | 10/1983 | Gray | |
| 4,419,538 A | 12/1983 | Hansell, III | |
| 4,425,397 A | 1/1984 | George | |
| 4,441,088 A | 4/1984 | Anderson | |
| 4,616,102 A * | 10/1986 | Noorily | 174/36 |
| 4,634,805 A | 1/1987 | Orban | |
| 4,644,099 A | 2/1987 | Basconi | |
| 4,658,090 A * | 4/1987 | Coon | 174/119 R |
| 4,668,581 A | 5/1987 | Luc et al. | |
| 4,675,625 A | 6/1987 | Johnston | |
| 4,678,864 A | 7/1987 | Cox | |
| 4,680,423 A | 7/1987 | Bennett et al. | |
| 4,695,679 A | 9/1987 | Strauss et al. | |

(Continued)

FOREIGN PATENT DOCUMENTS

CA 1228638 A1 10/1987

(Continued)

OTHER PUBLICATIONS

Withers, R.S. et al., "Superconductive Analog Signal Processing Devices," Proceedings of the IEEE, IEEE. New York, US, vol. 77, No. 8, Aug. 1, 1989, pp. 1247-1262.

(Continued)

*Primary Examiner*—William H. Mayo, III
(74) *Attorney, Agent, or Firm*—Sutherland Asbill & Brennan LLP

(57) ABSTRACT

An electrical wire includes at least one electrifiable conductor, and first and second return conductors which are respectively formed on opposing sides of the at least one electrifiable conductor, such that the at least one electrifiable conductor is at least substantially entrapped by said first and second return conductors.

73 Claims, 14 Drawing Sheets

U.S. PATENT DOCUMENTS

| | | | |
|---|---|---|---|
| 4,698,457 A | 10/1987 | Bordbar | |
| 4,746,769 A | 5/1988 | Piper | |
| 4,762,965 A | 8/1988 | Hata et al. | |
| 4,769,276 A | 9/1988 | Gruss et al. | |
| 4,783,579 A | 11/1988 | Brandolf et al. | |
| 4,845,311 A * | 7/1989 | Schreiber et al. | 174/36 |
| 4,864,081 A | 9/1989 | Bates | |
| 4,888,071 A | 12/1989 | Kauffman et al. | |
| 4,954,100 A | 9/1990 | McCleerey | |
| 4,992,059 A | 2/1991 | King et al. | |
| 5,003,273 A * | 3/1991 | Oppenberg | 333/1 |
| 5,064,684 A | 11/1991 | Mir et al. | |
| 5,068,632 A * | 11/1991 | Champeau | 333/238 |
| 5,089,329 A | 2/1992 | de Vrieze et al. | |
| 5,136,123 A * | 8/1992 | Kobayashi et al. | 174/258 |
| 5,162,611 A | 11/1992 | Nichols, III et al. | |
| 5,221,417 A | 6/1993 | Basavanhally | |
| 5,250,127 A | 10/1993 | Hara | |
| 5,274,195 A | 12/1993 | Murphy | |
| 5,274,196 A | 12/1993 | Weinberg | |
| 5,274,246 A | 12/1993 | Hopkins et al. | |
| 5,281,765 A | 1/1994 | Iura et al. | |
| 5,342,997 A | 8/1994 | Kanno et al. | |
| 5,373,109 A | 12/1994 | Argyrakis et al. | |
| 5,408,053 A | 4/1995 | Young | |
| 5,430,247 A | 7/1995 | Bockelman | |
| 5,468,159 A | 11/1995 | Brodsky et al. | |
| 5,500,489 A | 3/1996 | Shah et al. | |
| 5,554,825 A * | 9/1996 | Parker et al. | 174/117 F |
| 5,673,352 A | 9/1997 | Bauer et al. | |
| 5,847,324 A * | 12/1998 | Farquhar et al. | 174/117 FF |
| 5,939,952 A | 8/1999 | Noda et al. | |
| 6,005,193 A | 12/1999 | Markel | |
| 6,027,961 A | 2/2000 | Maiti et al. | |
| 6,055,722 A | 5/2000 | Tighe et al. | |
| 6,162,992 A | 12/2000 | Clark et al. | |
| 6,218,622 B1 * | 4/2001 | Rimmer | 174/117 FF |
| 6,225,568 B1 | 5/2001 | Lin et al. | |
| 6,271,472 B1 | 8/2001 | Mattos et al. | |
| 6,320,133 B1 * | 11/2001 | Rimmer | 174/117 F |
| 6,336,827 B1 | 1/2002 | Akama et al. | |
| 6,452,772 B1 * | 9/2002 | Snyder | 361/93.9 |
| 6,492,595 B1 * | 12/2002 | Sexton | 174/117 F |
| 6,512,423 B1 | 1/2003 | Koga | |
| 6,688,912 B1 | 2/2004 | Eastman et al. | |
| 6,774,741 B1 | 8/2004 | McCurdy et al. | |
| 6,841,735 B1 * | 1/2005 | Schilson et al. | 174/117 F |

FOREIGN PATENT DOCUMENTS

| | | |
|---|---|---|
| DE | 2439512 A1 | 3/1976 |
| EP | 0116505 | 8/1984 |
| GB | 1028980 | 5/1966 |
| GB | 2252197 A | 7/1992 |

OTHER PUBLICATIONS

Skalare, A. et al., "Slot Line Components for Millimeter Wave and Sub-Millimeter Wave Integrated Circuits," Proceedings of the European Microwave Conference. Folkets Hus, Sweden, Sep. 12-16, 1988, Tunbridge Wells, Microwave Exhibitions, GB, vol. CONF. 18, pp. 665-668.

* cited by examiner

ELECTRICAL WIRE AND METHOD OF FABRICATING THE ELECTRICAL WIRE

CROSS REFERENCE TO RELATED APPLICATIONS

This Application claims priority from U.S. Provisional Application No. 60/500,350, PROTECTIVE LAYERED AC ELECTRICAL WIRE, which was filed on Sep. 5, 2003, assigned to the present assignee, and is incorporated herein by reference.

BACKGROUND OF THE INVENTION

1. Field of the Invention

The present invention generally relates to an electrical wire and method of fabricating the wire, and more particularly, an electrical wire which includes at least one Electrifiable conductor (e.g., having a purpose of carrying an electrical current, e.g., an alternating current (AC) or direct current (DC) power supply, or a communication signal such as a voice or data transmission signal), and a return conductor (e.g., first and second return conductors) which at least substantially entraps the Electrifiable conductor.

2. Description of the Related Art

The earliest forms of wiring homes (1920s–1950s) utilized wire insulated with shellac permeated cloth wrap. Asphalted cloth wrap was used for insulation in the 1950s–1970s. Aluminum electrical wiring was installed in homes in the mid 1960s through the mid 1970s. Wire, as we know it today with two insulated inner conductors (e.g., hot/neutral or Electrifiable/return conductors) and a non-insulated ground conductor (e.g., grounding conductor), all within a thermoplastic outer insulator, has been used since the mid-1950s.

FIGS. 1A–1B illustrate examples of such conventional electrical wire. As illustrated in FIG. 1A, one conventional electrical wire 50 includes an Electrifiable (e.g., hot) conductor 55 surrounded by a first insulation layer 60, a return (e.g., neutral) conductor 65 surrounded by a second insulation layer 70. A third insulation layer 75 surrounds the insulated conductors 55, 65.

As illustrated in FIG. 1B, another conventional electrical wire 100 includes an Electrifiable (e.g., hot) conductor 105 surrounded by a first insulation layer 110, a return conductor 115 surrounded by a second insulation layer 120, and a grounding conductor 125. A third insulation layer 130 surrounds all of the conductors 105, 115 and 125.

Many millions of homes today are facing end-of-life scenarios regarding their older wiring and run significant risk of fire damage and casualties. According to the National Science and Technology Council November 2000 report, "[w]ire systems may become unreliable or fail altogether, due to poor design, use of defective materials, improper installation, or other causes. The risk of failure increases as wire systems age, due to cumulative effects of environmental stresses (e.g. heat, cold, moisture, or vibration), inadvertent damage during maintenance, and the wear and tear of constant use. The aging of a wire system can result in loss of critical function in equipment powered by the system . . . can jeopardize public health and safety and lead to catastrophic equipment failure or to smoke and fire." The Consumer Products Safety Commission estimates that 50 million homes in the United States have reached or are about to reach the "end-of-life" of their electrical wiring system.

Furthermore, wire insulation and/or conductors can deteriorate due to radiation, high temperature, steam, chafing, mishandling, corrosion, mechanical loading, and vibration. Reports issued by the Consumer Products Safety Commission (CPSC) show that in 1997 home wire systems caused over 40,000 fires that resulted in 250 deaths and over $670 million of property damage. Further study by the CPSC based on 40,300 electrical circuit fires showed that 36% were due to installed wiring and 16% were due to cord/plugs. Along with the usual wire system failures due to age and environmental stresses, aluminum wire systems were "prone to degradation and dangerous overheating".

Regarding modern wire systems and technology, the National Institute of Standards and Technology (NIST) and Building and Fire Research Laboratory (BFRL) acknowledge, "[w]ires and cables made with fluorocarbons have excellent flammability, but are very expensive. Flame-retarded polyvinyl chloride (PVC) cables also have excellent flammability and physical properties . . . However, the chloride content of (all) PVC cables is a concern for potential formation of dioxin during incineration."

As illustrated in FIGS. 1A–1B, conventional electrical wire which is commonly used in homes and offices today consist of solid, round wires individually insulated with PVC (except for the ground wire) with an outer PVC jacket surrounding the inner wires. Fires are increasingly being caused by overheated wires, insulation breakdown, and penetrations. The open spaces afforded by conventional in-wall or in-ceiling wiring offer plenty of oxygen for fire ignition and expansion associated with electrical fires.

Moreover, such conventional electrical wire poses an electric shock hazard and therefore, causes safety concerns. That is, such conventional electrical wire is often accidentally penetrated by objects such as nails, screws, drill bits, etc. which often results in the serious injury or death. Thus, such conventional electrical wire has a high potential for serious injury when penetrated by any of the aforementioned electrically conductive objects.

Other key examples of conventional wiring systems being inadequate in the changing-marketplace include:

(a) the proliferation of solid wall (and ceiling) construction techniques; and (b) the proliferation of new technologies and devices being installed in new and especially existing home and office environments that require wire interfaces and many are designed for surface mounting of these devices.

New materials such as foam block forms for poured concrete walls, removable form poured concrete walls, fabricated alternative materials to wood and recycled materials formed into solid wall (and ceiling) panels all represent better long-term characteristics and advantages over current "hollow" exterior and interior wall (and ceiling)construction techniques. These solid material construction techniques require some type of invasive channeling done on-site. This channeling has many drawbacks, safety concerns and costs associated. It also typically places the wiring closer to the finished surface where future invasions as previously described may cause shock or potential arch faults and fire potential. On a global scale the construction issues have existed for many years based on differences in construction techniques.

In addition, the advent of advances in audio, video and computer/internet applications have drastically changed the paradigm of home and office devices. Surround-sound home theater and multi-media conference room audio systems, flat-panel plasma and liquid crystal display (LCD) televisions, networked homes and offices, new applications of lighting, air quality and control systems have put tremendous strains and in many cases compromises on wiring systems. The requirement for alternating current (AC) or direct current (DC) electrical power interfaces and the associated wiring has created problems for the installer and the user.

SUMMARY OF THE INVENTION

In view of the foregoing, and other problems, disadvantages, and drawbacks of conventional methods, an exemplary aspect of the embodiments of the present invention provides an electrical wire and method of fabricating the electrical which may provide a safe and convenient electrical wire which is easily fabricated.

The inventors have determined that a new wiring system that is inherently safe and is designed to address the current and future needs of devices and technologies and how they are installed and used may be the only solution to the next long-term and in many cases short-term wiring crises.

The exemplary aspects of the present invention include an electrical wire which includes at least one electrifiable conductor, and first and second return conductors (e.g., at least one return conductor) which are respectively formed on opposing sides of the at least one electrifiable conductor, such that the at least one electrifiable conductor is at least substantially entrapped by the first and second return conductors. By "substantially entrapped" it is meant that a object penetrating an outer surface of the electrical wire is substantially prevented contacting the Electrifiable conductor without contacting the return conductor.

Further, the electrical wire may be surface-mountable and may be safely used for practically any voltage application (e.g., 0V to 240V or higher).

The wire may further include first and second insulating layers which are formed between the at least one electrifiable conductor and the first and second return conductors, respectively. Further, the at least one electrifiable conductor and the first and second return conductors may include substantially flat conductive layers having a stacked arrangement. The wire may also include an outer insulating layer (e.g., third and fourth insulating layers) formed on the first and second return conductors.

In addition, a distance between the at least one electrifiable conductor and each of the first and second return conductors (e.g., a thickness of an insulating layer between these conductors) is no greater than about 0.030 inches. For example, in one exemplary embodiment, this distance is no more than about 0.005 inches. Further, the first and second return conductors may contact each other along a longitudinal edge (e.g., at the edge of the width) of the electrical wire, such that the electrifiable conductor is completely entrapped (e.g., completely surrounded) by the first and second return conductors.

In addition, additional protection may be provided by working (e.g., treating) the longitudinal edges of the insulating layers, return conductors and/or grounding conductors. For example, the first and second return conductors may be treated by at least one method of mechanical, thermal or chemical treatment to form a protective longitudinal edge of the electrical wire, the protective edge inhibiting a foreign object from penetrating the electrical wire and contacting the Electrifiable conductor without contacting one of the first and second return conductors.

Similarly, the first and second insulating layers may contact each other along a longitudinal edge of the electrical wire. Further, the first and second insulating layers may be treated by at least one method of mechanical, thermal or chemical treatment to form a protective longitudinal edge of the electrical wire, the protective edge inhibiting a foreign object from penetrating the electrical wire and contacting the Electrifiable conductor.

Another aspect of the present invention includes an electrical wire including at least one electrifiable conductor, first and second insulating layers formed on opposing sides of the at least one electrifiable conductor, first and second return conductors formed on the first and second insulating layers, respectively, such that the at least one electrifiable conductor is at least substantially entrapped by the first and second return conductors, third and fourth insulating layers formed on the first and second return conductors, respectively, first and second grounding conductors formed on the third and fourth insulating layers, respectively, and fifth and sixth insulating layers formed on the first and second grounding conductors, respectively.

Further, the at least one Electrifiable conductor may include a plurality of Electrifiable conductors, formed in a plurality of horizontal segments across a width of the wire and a plurality of vertical segments across a thickness of the wire. In addition, at least one segment in the plurality of horizontal segments of the Electrifiable conductors may be used to transmit a communication signal (e.g., a voice communication signal and/or a data communication signal) and at least one segment in the plurality of horizontal segments of the Electrifiable conductors may be used to supply AC or DC electrical power.

Further, a capacitance formed between the at least one Electrifiable conductor and the first and second return conductors may be given as $C = 1.5 \cdot W \cdot L \cdot \in / d$, where W is the width of the return and electrifiable conductors, L is the length of the return and electrifiable conductors, $\in$ is the dielectric constant for the insulating layers (e.g., dielectric between the return and electrifiable conductors, and d is the distance between each of the return and electrifiable conductors.

In addition, the first and second grounding conductors may inhibit power transmission signals and load-generated electrical noise from being generated in the electrical wire. Further, the first and second return conductors and the first and second grounding conductors may be (e.g., substantially) thermally conductive for dissipating heat from the at least one Electrifiable conductor. Specifically, the first and second return conductors and the first and second grounding conductors may have (e.g., each may have) a rate of heat dissipation which is greater than a rate of heat dissipation for a round conductor, for a given cross-sectional area.

An important advantage of an exemplary embodiment of the present invention, is that substantially flat conductors may have a larger surface area than a round conductor (e.g., for a given conductor cross-sectional area). The increased surface area provides a much greater heat transfer rate. Since the cross-sectional geometry may not substantially vary with respect to longitudinal direction, the pertinent variable is the perimeter along the edge of any given conductor and how it varies when the total cross-sectional area is maintained constant.

The substantially flat conductors can, therefore, carry a greater amount of electricity for a given cross-sectional area (e.g., of the conductor) if the resulting steady-state temperature is kept constant and if surrounding environment is kept constant. Alternatively, the steady-state temperature would be lower on substantially flat conductors (versus round conductors) if the current flow is maintained constant and all other factors remain the same Further, it may be preferable for the wire to have a thickness ratio of about 1 or more. That is, the first and second return conductors may each have a thickness $T_G$, and the first and second grounding conductors each have a thickness $T_N$, and the Electrifiable conductor has a thickness $T_H$, such that a ratio, R, of thicknesses $R=(T_G+T_N)/T_H$ is about 1.00 or more (e.g., it may be preferable that R is maximized).

Another aspect of the present invention includes an electrical wire including at least one electrifiable conductor, a first insulating layer formed around the at least one electrifiable conductor, a return conductor formed around (e.g., at least substantially around) the first insulating layer, such that the at least one electrifiable conductor is at least substantially entrapped by the return conductor, and a second insulating layer formed around the return conductor. The wire may further include a grounding conductor formed around the second insulating layer, and a third insulating layer formed around the grounding conductor.

This aspect of the wire may include, for example, a wire having conductors (e.g., electrifiable conductor, return conductor and grounding conductor) having one of substantially curvilinear-shaped cross-sectional geometries and substantially rectilinear cross-sectional geometries, and may be formed in substantially parallel planes. For example, the electrical wire may have a circular or oval cross-section. That is, the electrifiable conductor, the return conductor and the grounding conductor may include substantially circular-shaped conductors (e.g., having a circular cross-section) which are arranged with a parallel longitudinal axes (e.g., coaxial), or the electrifiable conductor, the return conductor and the grounding conductor may include substantially oval-shaped conductors (e.g., in the same spatial arrangement).

Another aspect of the present invention includes a method of fabricating an electrical wire, which includes forming at least one electrifiable conductor, and forming first and second return conductors on opposing sides of the at least one electrifiable conductor, such that the at least one electrifiable conductor is at least substantially entrapped by the return conductors.

Another aspect of the present invention includes an electrical current delivery system including the electrical wire. In addition, another aspect of the present invention is an electrical signal transmission system including the electrical wire.

With its unique and novel features, the present invention provides an electrical wire and method of fabricating the electrical wire which provides an electrical wire and method of fabricating the electrical which may provide a safe and convenient electrical wire which is easily fabricated.

BRIEF DESCRIPTION OF THE DRAWINGS

The foregoing, and other objects, aspects, and advantages will be better understood from the following detailed description of the exemplary embodiments of the invention with reference to the drawings, in which.

DETAILED DESCRIPTION OF EXEMPLARY EMBODIMENTS OF THE INVENTION

Figure 1A:
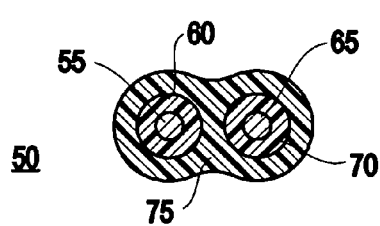
FIGS. 1A–1B illustrate conventional electrical wires 50 and 100.
Figure 1B:
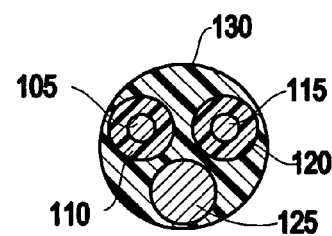
Figure 2A:
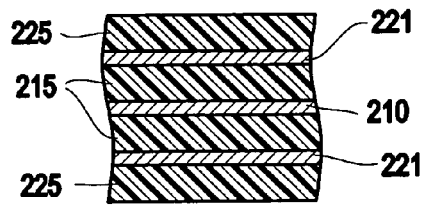
FIGS. 2A–2F illustrate various aspects of an electrical wire 200 according to the exemplary embodiments of the present invention.

Referring now to the drawings, and more particularly to FIGS. 2A–17, the present invention includes an electrical wire 200 and a method 1500 of fabricating the electrical wire. As illustrated in FIG. 2A, the exemplary embodiment of present invention is directed to an electrical wire 200 including at least one electrifiable conductor 210, and first and second return conductors 221 which are respectively formed on opposing sides of the at least one electrifiable conductor 210, such that the at least one electrifiable conductor is at least substantially entrapped by the first and second return conductors 221. The wire 200 may also include a first insulating layers 215 and second insulating layers 225.

It should be noted that unless otherwise noted, any of the layers (e.g., conductors, insulating layers, etc.) in the present invention and discussed herein may be formed of a plurality of layers. Thus, for example, insulating layer 215 should be construed as at least one insulating layer 215, an electrifiable conductor should be construed to mean at least one (e.g., a plurality of) electrifiable conductors, and so on.

The electrical wire may be used for a basically unlimited range of voltage applications (e.g., 0V to 240V and higher). For example, the wire may include a Class 1 or Class 2 capability and other low voltage/current capabilities, and may be used for commercially available utility voltages such as 120V AC and 240V AC, and may be used for other applications other than Class 1 or Class 2, or these commercially available voltages.

Figure 2B:
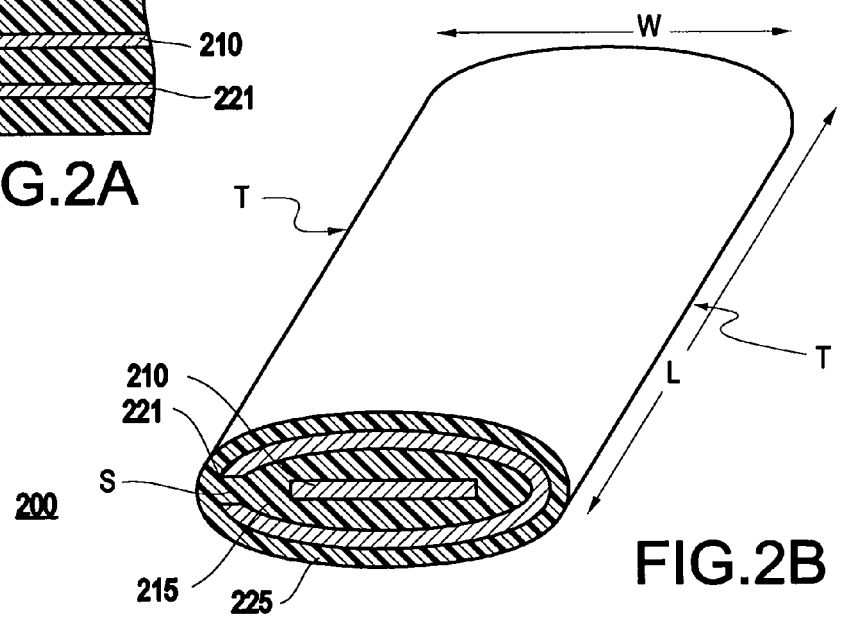

As illustrated in FIG. 2B, the electrical wire 200 may have a longitudinal (e.g., lengthwise) direction, L, and a transverse (e.g., widthwise) direction, W. These directions may also be referred to as a horizontal dimension of the wire. The wire may further be considered as having a thickness (e.g., a total thickness of all of the stacked layers) which may be referred to as a vertical dimension.

The wire 200 may also include terminal portions (e.g., terminations) (e.g., not illustrated in FIG. 2B) formed at the ends of the wire 200 in the longitudinal direction. For example, one end (e.g., terminal portion) of the wire 200 may be connected to a source module (e.g., power source, voice/data transmission source, etc.) and the other end (e.g., terminal portion) may be connected to a destination module (e.g., switch, outlet, electronic device, etc.). It should be noted that the present invention does not necessarily include any particular form termination (e.g., current source, earth ground, etc.) but may include a longitudinal portion of wire formed between two termination points.

As further illustrated, the first and second return conductors 221 are formed such that the at least one electrifiable conductor is at least substantially entrapped (e.g., enveloped, surrounded, encased) by the first and second return conductors. By "substantially entrapped" it is meant that for all practical purposes, the electrifiable conductor 210 cannot be contacted with a foreign object (e.g., a nail, screw, staple, etc.) without first touching the one of the return conductors 221. The term "substantially entrapped" does not necessarily mean that the return conductors 221 completely surround the electrifiable conductor (although such a design is possible). Instead, it means that any distance between the return conductors and the electrifiable conductor (e.g., the thickness of an insulating layer between the electrifiable conductor and a return conductor) is so small (e.g., about 0.030" or less) that such a foreign object cannot reasonably go between the return conductors and the electrifiable conductor without touching the return conductors.

For example, as illustrated in FIG. 2B, the electrical wire 200 may be formed of layers (e.g., substantially flat layers) having a stacked configuration. At least some of these layers (e.g., return conductor 221, insulating layers 215, 225) may be brought together (e.g., mated together by crimped, bonded, etc.) along the longitudinal edges, T, of the wire 200.

It is important to note that there may remain a distance, S, between the return conductor layers 221. That is, the electrifiable conductor 210 does not have to be completely entrapped by the return conductors 221. The inventors have determined that so long as any distance between the return conductors and the electrifiable conductor (e.g., the thickness of an insulating layer between the electrifiable conductor and a return conductor) is sufficiently small (e.g., about 0.030" or less) an object cannot likely penetrate the wire 200 and contact the Electrifiable conductor 210 without first contacting the return conductor 221.

Further, the electrifiable conductor is at least "substantially entrapped" along the longitudinal portion of the wire. That is, at the terminal portions of the wire 200, the electrifiable conductor may be exposed and not entrapped, for connection to a device (e.g., a source or destination module).

It should also be noted that the term "Electrifiable" is intended to mean having a capability (e.g., purpose) of connecting to a source or electrical current and carrying (e.g., delivering) an electrical current or electrical signal (e.g., an AC or DC power supply or an electrical communication signal such as a voice or data transmission signal). An Electrifiable conductor may be referred to as the "non-return conductor". An Electrifiable conductor may also be referred to as a "hot conductor". Further, the term "return" is intended to mean having a purpose of returning an electrical current (e.g., not having a purpose of delivering an electrical current or electrical power supply to a load). A return conductor may also be referred to as a grounded conductor or a neutral conductor.

Specifically, an "electrifiable" conductor may be considered any conductor within the "hot zone" as defined herein. The electrifiable conductor (e.g., a conductor in the hot zone) may be the "hot" conductor in operation but not necessarily. For example, with regards to a 3-way switch, the electrifiable conductor (e.g., a conductor in the "hot zone") may in one condition, act as a hot conductor, but in another condition act as a ground conductor.

In addition, the term "grounding" is intended to mean having a capability or purpose of connecting to "earth ground". A grounding conductor may also be referred to as simply a "ground conductor". The grounding conductor is not intended to have any return current on it. Further, the term "conductor" is defined to mean a conductive medium which is capable of carrying an electrical current.

Figure 2C:
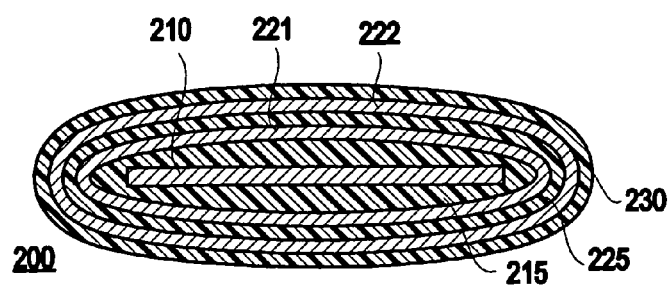
Figure 2D:
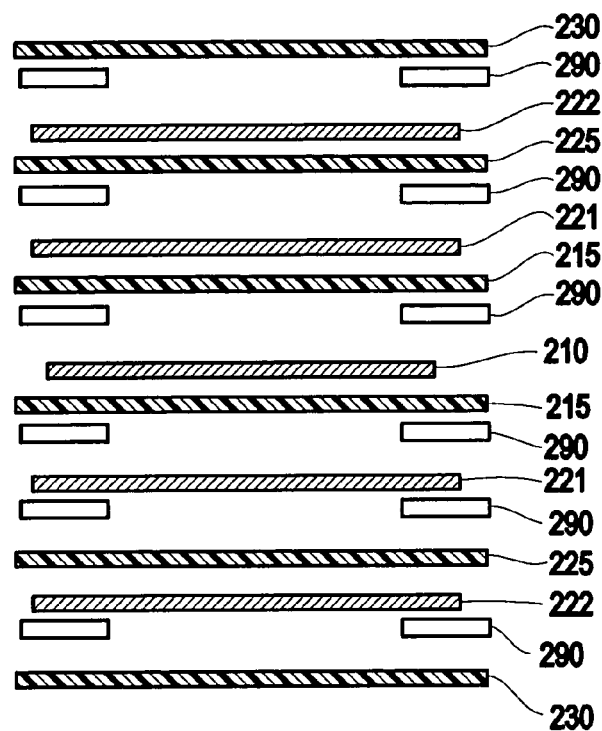

FIGS. 2C–2D illustrate another exemplary embodiment of the present invention. In the exemplary aspect which is illustrated in FIG. 2C, the electrical wire 200 includes at least one first conductor 210 which is Electrifiable, at least one return conductor 221 and at least one grounding conductor 222.

In this aspect, the wire 200 may also include a first insulating layer 215, a second insulating layer 225, and a third insulating layer 230. As illustrated in FIGS. 2C, the first insulation layer 215 may be formed between the at least one Electrifiable conductor 210 and the at least one return conductor 221, the second insulation layer 225 may be formed between the at least one return conductor 221 and the at least one grounding conductor 222, and the third insulation layer 230 may be formed on the at least one grounding conductor 222.

FIG. 2D illustrates an exploded view of an exemplary aspect of the electrical wire 200. As illustrated in FIG. 2D, the conductors of the electrical wire 200 may have a stacked arrangement. The electrical wire 200 may also include an adhesive 290 for bonding adjacent insulation layers and conductors in the electrical wire.

It should be noted that the drawings are intended to be illustrative. In the actual electrical wire of the present invention, there may be no visible spacings (e.g., the white areas in FIG. 2D) between the conductors, insulation, and adhesives components, each of which is described further below.

Figures 2E, 2F:
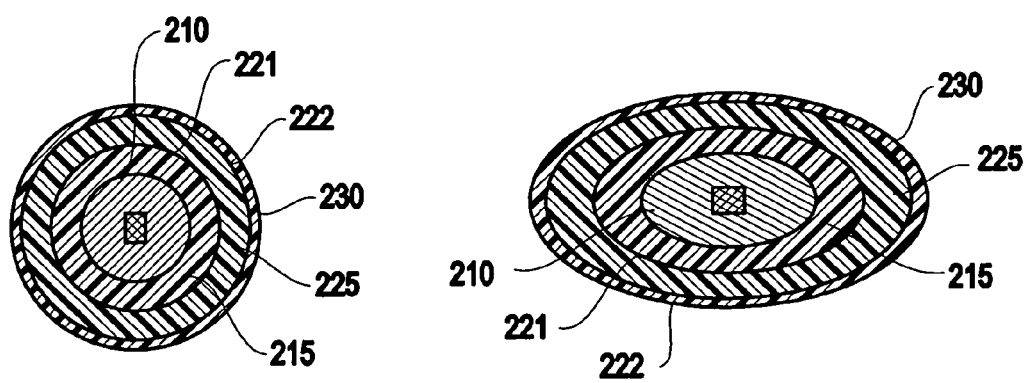

FIGS. 2E–2F illustrate additional exemplary aspects of the electrical wire 200. For example, in the exemplary aspect of FIG. 2E, the conductors 210, 221, 222 may include substantially circular-shaped conductors (e.g., coaxially arranged). In the aspect of FIG. 2F, the conductors 210, 221, 222 may include substantially oval-shaped conductors.

In general, the electrical wire of the present invention (e.g., protective layered wire) provides an alternative which can be applied in a variety of ways and in a variety of locations and represents a paradigm shift for all other electrical wire systems. The electrical wire may include protective layered wire which can have conductors with a parallel longitudinal axis (e.g., conductors having a curvilinear cross-section), or the wire may be substantially stacked in nature, such that each conductor has a substantially parallel plane (e.g., parallel axis). However, the conductor cross-section is not necessarily coincidental (e.g., concentric) or coaxial.

For example, in one aspect, an inner (hot) conductor is surrounded or bounded by an insulator, then an intermediate (neutral) conductor, a second insulator, then an outer (grounding) conductor, and an outer insulator.

The exemplary embodiments of the electrical wire can have cross-sectional shapes ranging from a substantially curvilinear geometry such circles (e.g., concentric circles), ovals, ellipses, or flat (e.g., linear or rectilinear) layers. The concentric format (e.g., FIG. 2E) (e.g., major and minor axes approximately equal) is symmetric with an innermost conductor (e.g., hot/Electrifiable) having relatively small surface area. The oval or ellipsoid format (e.g., FIG. 2F) (e.g., major and minor axis unequal) supports a relatively flat innermost conductor. The flat format (e.g., FIGS. 2B–2D) (major axis=1, minor axis=0) supports all flat conductors and insulators (e.g., multi-planar flat conductor wire).

The exemplary embodiments of the electrical wire may offer differing advantages regarding safety, application methodology, cost, and ease of manufacture. The concentric and oval formats may have exceptional safety aspects (e.g., a very low penetration hazard). Whereas, the flat format has an exceptional current carrying capability due to a large surface area of each conductor and would likely trip any safety disconnect device (e.g., breaker, GFCI, etc.) in any case of penetration. Further, the use of the electrical wire (e.g., protective layered wire) is advantageous from a number of points of view including safety, electrical interference shielding, and flammability.

Regarding the risk of electrocution, the inevitable issue centers around penetration of an electrified conductor (e.g., an electrifiable conductor) by objects such as nails, screws, drill bits, etc. Traditional in-wall and in-ceiling wiring has the potential for penetration by any of the aforementioned objects with a possibility of electrocution as a result.

Although the electrical wire of the present invention may be surface mounted (e.g., on a wall or ceiling, or on a floor such as under a carpet) it has the distinct advantage over conventional wire by assuring that the penetrating object first passes through at least one non-Electrifiable conductor (e.g., a return conductor and/or a grounding conductor) prior to any contact with the Electrifiable (e.g., hot/innermost) conductor. Thus, as the penetration motion proceeds, high currents on hot through the ground and neutral are generated causing a circuit breaker to expeditiously trip.

Specifically, with respect to this penetration dynamics solution of the electrical wire (e.g., stacked electrical wire), to reduce the chance for electrification of a penetrating object, conductor thickness of the Electrifiable conductor (e.g., hot conductor) should be low (e.g., as low as possible) relative to the total thickness of the outer layers (e.g., grounding conductors and return conductors). A good layer thickness ratio, R, of 1.00 has been demonstrated through test results, whereby $R=(T_G+T_N)/T_H=1.00$, where $T_G$, $T_N$, and $T_H$ are the conductor thickness of the Grounding, Grounded, and Electrifiable conductors, respectively, and R is the Layer Thickness Ratio. For example, in one exemplary embodiment, the thickness of the grounding and return conductors was 0.001", and the thickness of the Electrifiable conductor was 0.002, such that the ratio $R=(T_G+T_N)/T_H=(0.001"+0.001")/0.002"=1.00$.

Further, in the penetration dynamics of the electrical wire, the opposing Grounded and Grounding layers may also contribute favorably to the ratio, R, resulting in a safer condition. It has been shown that the higher this ratio, R, is, the safer the wire is during a penetration with a conductive object such as a nail.

During the short circuit, the electrical wire may act as a voltage divider from the source to the point of penetration. The layer thickness ratio produces a ratio-metric scaling of the voltage that is applied from within to the penetrating object. Therefore, the safer condition results from the lower voltage at the nail, etc.

During a penetration to increase the probability of actuation and to decrease the actuation time of a safety device (e.g., circuit breaker, circuit interrupter (e.g., GFCI) or other safety disconnect device), the conductor thickness of the outer (e.g., grounding and return conductors) layers must be substantial enough to cause a reliable short circuit at the point of penetration. The short circuit must result in high currents that cause the safety devices to trip at their fastest response time. This results in a safer condition based on time. The combination of lower voltage and shorter time produces a significantly safer condition than either condition by itself.

At the point of penetration, after the safety device has removed from the power supply, it can be assumed that all layers remain in a relatively low resistance relationship. This is due to the presence of the penetrating object and/or the insulation displacement damage of the various layers. Furthermore, the flashpoint of the penetration may cause somewhat of a melded or fused area in the perimeter of the penetration. With repeated application of power into the damaged area, the perimeter may increase (e.g., especially if the penetrating object has been removed) in size but sufficient resistance will be residual enough to repeat reactivations of the safety device upon being reset.

The way to avoid repeated application of power into the damaged area could be to have a circuit within an Active Safety Device (ASD) that can detect a substantially shorted return to grounding conductors prior to applying power to the electrical wire. This feature capability is supported by the design of the electrical wire.

Therefore, the electrical wire (e.g., protective layered wire) of the present invention can be considered inherently safe with a circuit breaker or fuse. In addition, the safety can be further improved when the wire is used in conjunction with a safety device (e.g., circuit breaker, circuit interrupter (e.g., ground fault circuit interrupter (GFCI)) or other safety disconnect device).

The exemplary embodiments of the present invention also provide advantages with respect to other electrical safety issues, such as frayed insulation allowing incidental contact and possible electrocution are better solved by the exemplary embodiments of the present invention (e.g., protective layered electrical wire) in that it may include three layers of insulation between the hot conductor and the outside world (in any direction). This is commonly referred to as "triple-insulated" as opposed to contemporary double-insulated conventional wire.

Regarding electrical shielding, the outer grounding layer of the electrical wire of the present invention (e.g., protective layered wire) may provide a shield whereby power transmission signals or load-generated electrical noise cannot pass through the cable to interfere with broadcast signals or to cause "hum" in audio equipment.

In addition, regarding flammability, the electrical wire of the present invention offers several advantages over conventional electrical wires and wiring systems. Specifically, the electrical wire of the present invention may provide a relatively large surface area for dissipating heat. Thus, the outer conductor(s) (e.g., return and grounding conductors) may easily conduct heat away from film insulation being heated from an external source, reducing the risk of fire caused by the heat. Further, the rate of heat transfer may exceed the combustion rate, thus quenching a localized combustion area.

Additional "layers of protection" can be added to the electrical wire of the present invention. For example, in addition to an electrical wire (e.g., protective layered wire) and circuit breaker configuration, a GFCI, arc fault detector, and specially developed "active safety devices" may also be included and used with the electrical wire to further reduce the probability of shock, electrocution or fire.

In addition, since the Electrifiable conductor in the present invention may be provided between (e.g., within) the return and grounding conductors, the return and grounding conductors and the insulation layers may provide abrasion protection for the Electrifiable conductor. That is, the layers formed on the electrifiable conductor (e.g., insulation layers, return conductor and grounding conductor) may inhibit abrasion of the Electrifiable conductor such as when a wall (or ceiling) on which the wire is mounted is sanded with sandpaper or any other abrasive.

Further, the electrical wire of the present invention may include a flat, flexible, wire that allows the user to bring electricity to any area of a wall or ceiling in a room. The electrical wire may be very thin (e.g., having a total thickness of no more than 0.050 inches) and can be mounted to the surface of the wall, ceiling or floor (e.g., using an adhesive), thereby eliminating the need for costly inner wall, ceiling or floor rewiring. The wire may also be painted or papered over to match the rest of the surface.

Each of the conductors in the electrical wire of the present invention may include one or a plurality of conductive layers (e.g., conductive copper, aluminum or other conductive material layers) which are each about 0.0004 to about 0.020 inches thick, and preferably on the order of about 0.001 inches thick or less.

The conductors may be formed of a variety of materials and have a variety of patterns, dimensions and spacings. For example, the conductors may be formed of an electrically conductive material such as metal (e.g., copper, aluminum, silver, other conductive materials, etc.), polysilicon, ceramic material, carbon fiber, or conductive ink. Further, the conductors may be very thin.

The conductor thickness should be consistent across its length and width, thereby eliminating any resistance "hot spots". The current carrying specifications of a particular application may be accomplished in any of three ways, either individually or in combination. First, the width of the conductors may be varied. Second, additional thin conductive layers (e.g., copper, aluminum or other conductive material) may be stacked for each conductor. Third, the thickness of the conductor may be increased.

For example, in one exemplary load and current application, each conductor may include about two conductive layers (e.g., copper, aluminum or other conductive material layers). It is understood, however, that utilizing more or less layers, for each of the below disclosed embodiments, is within the scope of the invention.

The insulating layers in the electrical wire may be formed of a variety of materials. For example, the insulating layers may include a polymeric material (e.g., polypropylene film, polyester film, polyethylene film, etc.). Further, the insulating layers may have a thickness, for example, in a range of 0.00025 to 0.030 inches.

The insulation layers formed between the conductors may also orient the conductive layers. In addition, the insulation material may be used alone, or in combination with the internal adhesive, to separate the conductors and maintain a safe distance between conductors of different purposes (e.g., grounding vs return or Electrifiable (e.g., hot)). Further, the electrical wire may have tapered edges (e.g., tapered in a transverse width direction) to facilitate the optical occlusion (e.g., when mounted on a ceiling or wall). For example, the layers (e.g., conductor layers and/or insulation layers) may have different widths to facilitate such a tapered edge.

It is understood that additional insulative materials are considered to be within the scope of this invention and maybe used so long as the insulation is compliant, paintable, and bondable to surfaces. The insulation should also be compatible with concealing (e.g., joint) compounds, be UV tolerant, and have similar thermal expansion and contraction characteristics as that of the conductors and the surface to which it is adhered.

Other desirable properties are that the insulation should withstand tensile forces applied in the fabrication process, not retract or relax under storage conditions, and be removable when its use is completed. Any abrasion, cracking, cutting, piercing, or any other insulation damage (e.g., damage that would render an unsafe exposure to bodily harm or damage, or physical or construction damage, such as to a structure) will be made safe using electronic means of failure detection that will disconnect potentially harmful or damaging currents from the user in a time frame that will prevent permanent harm.

Further, adhesive material 290 (e.g., FIG. 2D) should be able to bond to the insulation layers and the conductors. For example, adhesive tape, liquid adhesive, thermal adhesive, pressure-sensitive adhesive or UV sensitive adhesive or a combination of any such adhesives or adhering methods, may be used as an internal adhesive. The internal adhesive material may also function to separate the conductive layer groups and maintain a safe dielectric distance between conductors of different purposes.

An external adhesive layer may also be formed on the outermost insulating layer of the electrical wire, for adhering the wire to a desired surface. The external adhesive layer could be, for example, two-sided tape, with one side being fixed to the back of the wire and the other to the wall (or ceiling) or surface. Alternatively, a chemical adhesive may be applied separately, and may consist of any of the adhesives with good bonding qualities to both the insulation layer and the desired surface to which the wire is adhered. Insulating layers may also be joined by mechanical deformations and thermal fusing without the addition of any adhesive.

Figure 3A:
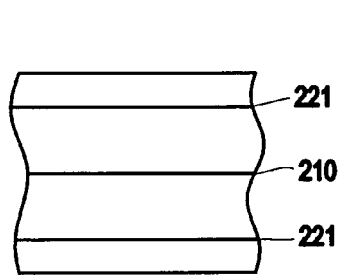
FIGS. 3A–3W illustrate various possible conductor configurations in the electrical wire 200 according to the exemplary embodiments of the present invention.
Figure 3B:
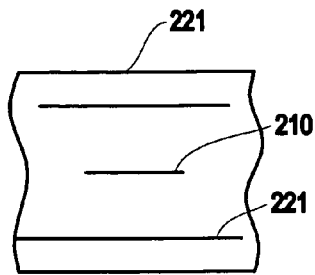
Figure 3C:
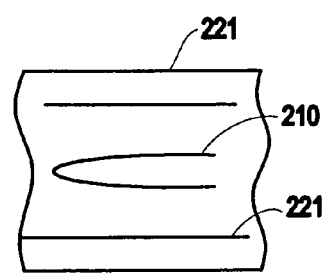
Figure 3D:
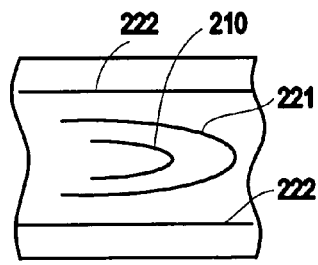
Figure 3E:
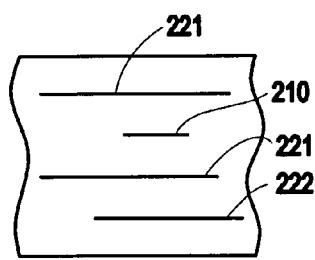
Figure 3F:
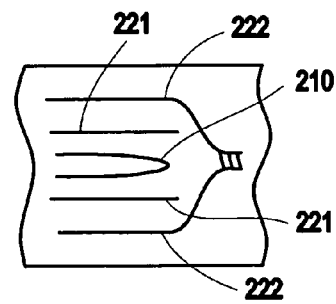
Figure 3G:
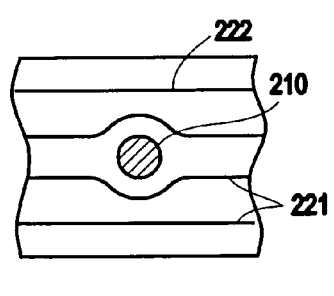
Figure 3H:
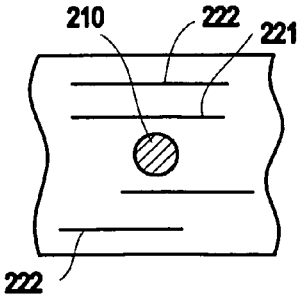
Figure 3I:
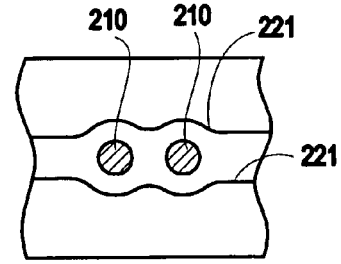
Figure 3J:
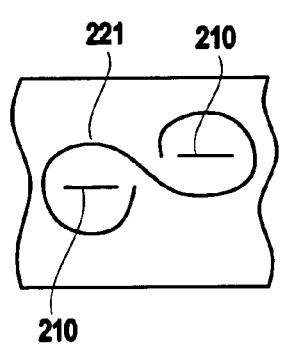
Figure 3K:
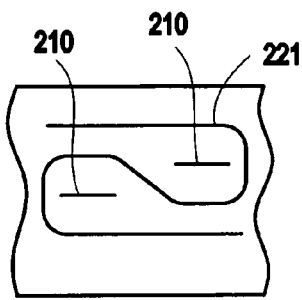
Figure 3L:
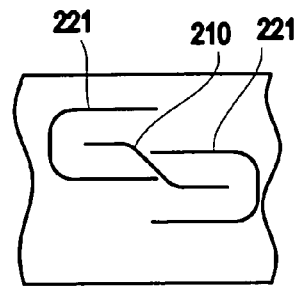
Figure 3M:
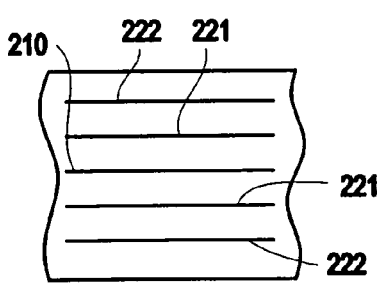
Figure 3N:
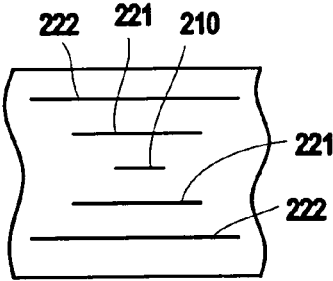
Figure 3O:
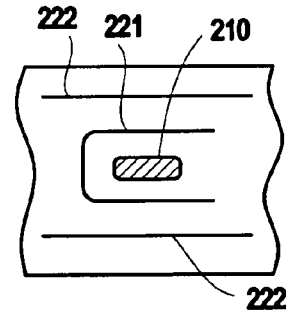
Figure 3P:
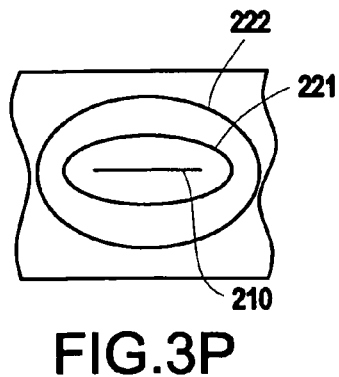
Figure 3Q:
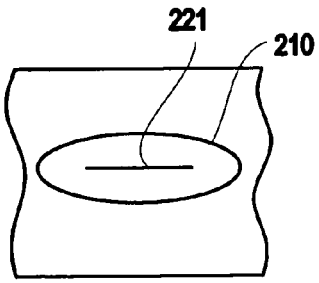
Figure 3R:
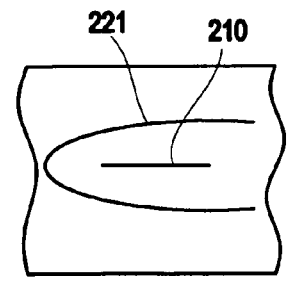
Figure 3S:
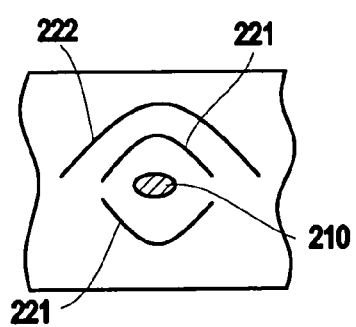
Figure 3T:
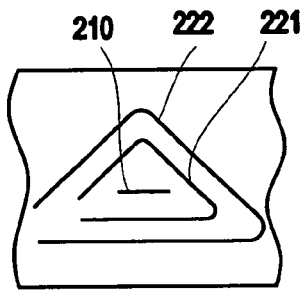
Figure 3U:
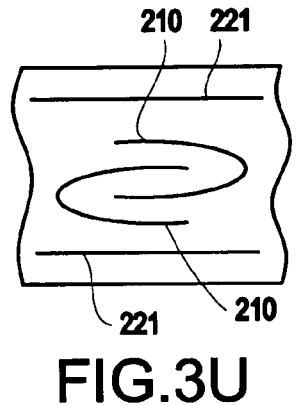
Figure 3V:
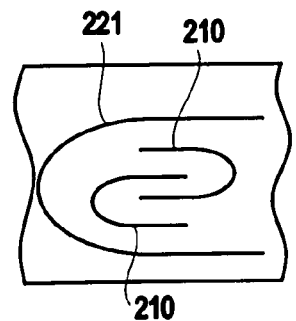
Figure 3W:
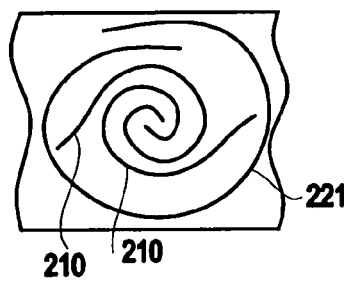

Referring again to the drawings, FIGS. 3A–3W illustrate cross-sectional views of possible configurations of the electrical wire 200 according the exemplary aspects of the present invention (for simplicity, the insulating layers are not identified in FIGS. 3A–3W).

For example, the wires of FIGS. 3A and 3M are similar to the wires of FIGS. 2B and 2C, respectively. As shown in FIGS. 3B, 3E and 3N, the conductors may have a staggered arrangement and may include non-uniform widths (e.g., in a transverse direction).

As illustrated in FIG. 3C, the conductors (e.g., Electrifiable conductor 210) may be folded over on themselves. Further, as illustrated in FIG. 3D, another conductor (e.g., return conductor 221) may be folded over a folded conductor (e.g., Electrifiable conductor 210).

As illustrated in FIG. 3F, the conductors may be treated (e.g., thermally, chemically or mechanically) or bonded by some manner on a side. For example, in FIG. 3F, an upper conductor 222 is joined (e.g., by stitching, seam welding, chemical bonding, or other mechanical means) to a lower conductor 222. This may be used to provide a more protective barrier along the longitudinal edges of the electrical wire, making it more difficult for an object to penetrate the electrical wire and contact the electrifiable conductor from such longitudinal edge.

FIG. 3G–3I illustrates a wire in which a conductor 210 has a round shape, whereas conductors 221 and 222 are wave-shaped or substantially flat. Further, FIGS. 3J–3L illustrate a wire in which the conductors may each be bent such that they are formed in more than one plane. For example, in FIG. 3J, the conductor 221 has a bent configuration for substantially surrounding the conductors 210.

FIGS. 3O and 3S illustrate a wire in which a conductor 210 has a substantially oblong (e.g., oval) shape, whereas the other conductors 221, 222 may be substantially-flat or bent. In FIGS. 3P–3R, and 3T, some of the conductors may be substantially-flat and other of the conductors may be formed around (e.g., partially around) the flat conductor. Further, as illustrated in FIGS. 3U–3W, the conductors (e.g., conductors 210 in FIG. 3U) may be bent around each other in an interlocking manner.

Figure 4A:
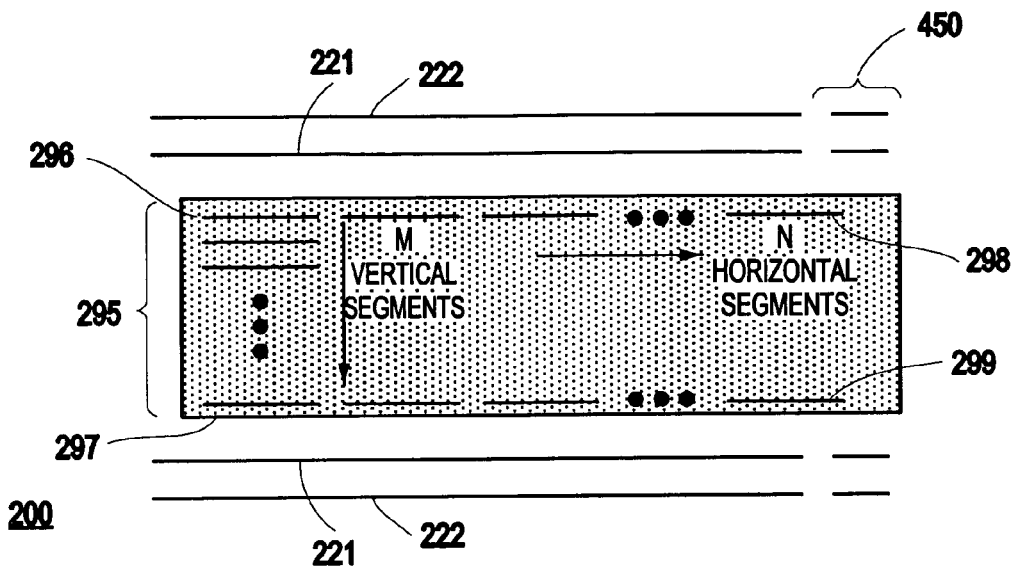
FIGS. 4A–4C illustrate an aspect of the electrical wire 200 having a hot zone 295 according to the exemplary embodiments of the present invention therein.
Figure 4B:
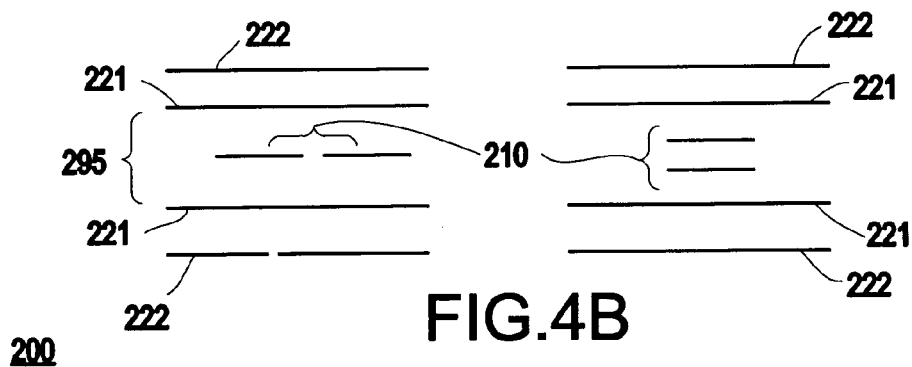
Figure 4C:
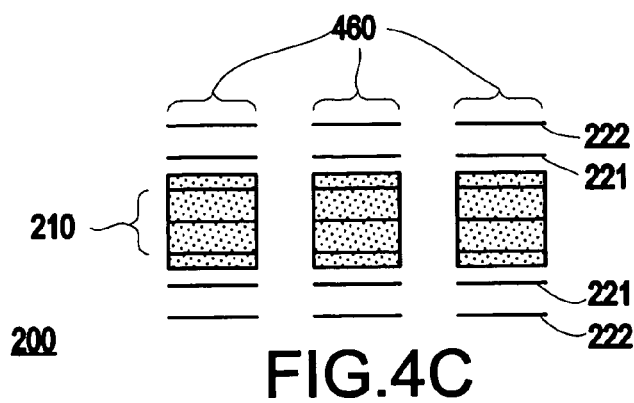

FIGS. 4A–4C illustrate another exemplary aspect of the electrical wire according to the present invention. These drawings describe the "hot zone" which is an important concept introduced by the present invention. Specifically, the "hot zone" may be considered as a zone which is at least "substantially entrapped" by a return conductor. As illustrated in FIG. 4A, the hot zone may include layer segments arranged in any horizontal and vertical format, depending upon the application(s) of the electrical wire.

For example, FIG. 4A illustrates a cross-sectional view of a general case for a conductor orientation. It should be noted that the insulating layers (and adhesive) are not shown in FIGS. 4A–4C for simplification.

As shown in FIG. 4A, the electrical wire 200 may include grounding conductors 222 and return conductors 221 formed on opposing sides of (e.g., above and beneath) the hot zone 295. Moreover, in the hot zone 295 is included "M" vertical segments, and "N" horizontal segments of Electrifiable conductors. More specifically, the hot zone 295 may include segment (1,1) 296, through segment (1,M) 297, and segment (N,1) 298 through segment (M,N) 299. It should be noted that M and N are not particularly limited.

In addition, an application of the wire according to the exemplary aspects of the present invention may include transmission of electrical communication signals such as voice and data transmission signals. For example, the wire may be used as part of power line carrier (PLC) communication system in which the wire (e.g., a portion of the wire) is used to provide AC electrical power, and is also used (e.g., a portion of the wire is used) as a network medium to transmit voice and/or data communication signals. Thus, the wire may be used to provide high speed network access points wherever there is an AC electrical outlet.

Specifically, the wire may transmit electrical communication signals during the time proximity of zero-crossing of an AC power supply. In addition, there can be many different types (e.g., formats) of communication signals transmitted by the wire including RS485, HDTV, etc., according to the present invention.

For example, as illustrated in FIG. 4A, the electrical wire 200 may also include a portion 450 which may be reserved for an electrical signal (e.g., a communications signal) in addition to an electrical power being supplied elsewhere by the "hot zone". For example, the conductors in this reserved portion 450 may include patterned conductors such as those described in McCurdy, et al., U.S. patent application Ser. No. 10/154,929 (NON-UNIFORM TRANSMISSION LINE AND METHOD OF FABRICATING THE SAME) which was filed herein on May 28, 2002, and which is commonly assigned with the present Application and is incorporated by reference herein. Further, the wire 200 may include a plurality of such portions 450 which may each be dedicated to carrying the same or different types (e.g., formats) of communication signals.

It should be noted that the electrical wire according to the exemplary aspects of the present invention may be used for transmitting communication signals independently of any electrical current. That is, the Electrifiable conductors may be dedicated entirely to communication signals or entirely to an electrical power supply.

For 3-way switching of lights there may be a need for two conductors in the hot zone that will alternately be switched from return to electrified (e.g., neutral to hot). FIG. 4B illustrates two possible embodiments to accomplish this with the present invention.

For example, the first embodiment (on the left) includes return conductors 221 and grounding wires 222. In addition, this embodiment includes two Electrifiable conductors 210 which are substantially co-planar in the hot zone 295. The second embodiment (on the right) is similar to the first embodiment, except that the Electrifiable conductors have a stacked arrangement.

It should be noted that the first embodiment provides an electrical wire with a smaller thickness (e.g., thinner), whereas the second embodiment provides a electrical wire having a smaller width (e.g., narrower). As noted above, the exemplary embodiments of the electrical wire may be used for a basically unlimited range of voltage applications (e.g., 0V to 240V and higher). For example, the wire can be used to supply 2-phase power such as standard 240V AC.

Further, FIG. 4C illustrates an electrical wire 200 according to another exemplary aspect. As shown in FIG. 4C, the electrical wire 200 may include a "N" plurality of horizontal stacks 460, each stack having "M" Electrifiable conductors 210.

This aspect may be used, for example, for multiple branch circuits. It should be noted that the horizontal segments may share a common insulator between layers and on the outside of the grounding conductors 222.

Figure 5:
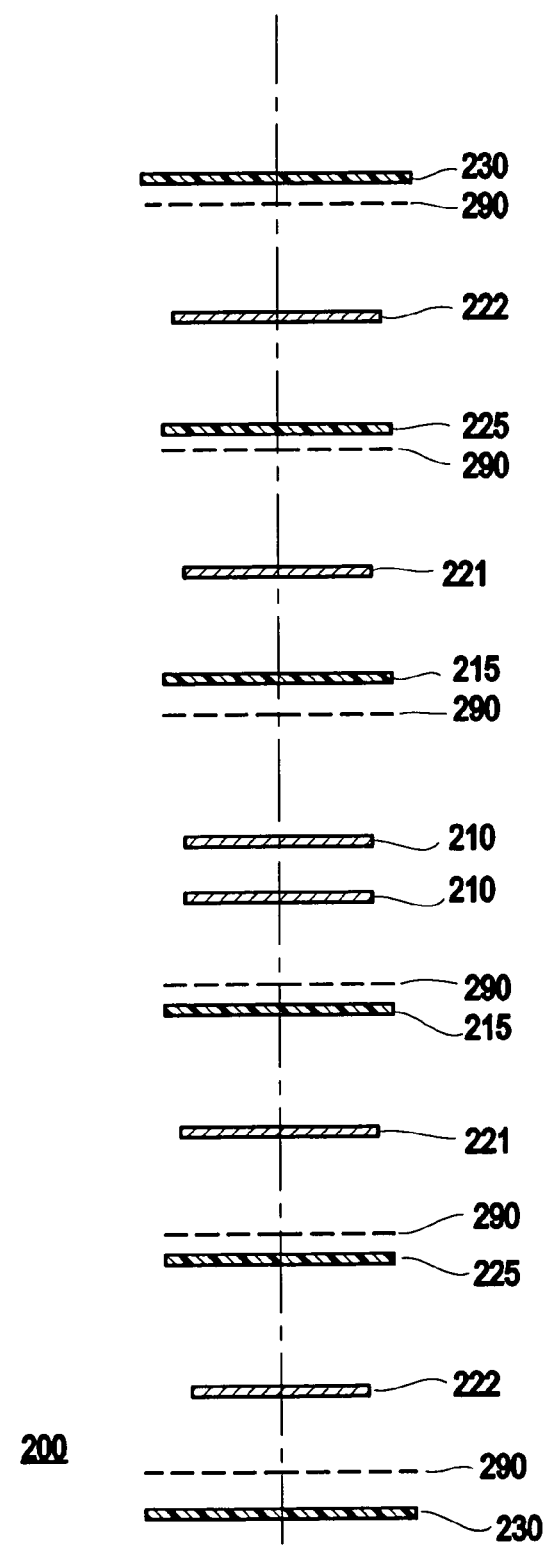
FIGS. 5 illustrates another aspect of the electrical wire 200 according to the exemplary embodiments of the present invention therein.

Referring again to the drawings, FIG. 5 illustrates another exemplary aspect of the electrical wire 200 of the present invention. (Note that the wire of FIG. 5 is similar to that in FIG. 2D). As shown in FIG. 5, the electrical wire 200 may include 14 AWG (e.g., American Wire Gauge) electrical wire. For example, an adhesive 290 may be included as illustrated.

Further, the wire 200 may include insulating layers 215, 225 and 230 which are formed of polyester and which are 0.001 inches thick, fully annealed. The wire 200 also includes conductors 210, 221 and 222 which are formed of copper (or aluminum or other conductive material) CDA 102 or CDA 110, having a thickness of 0.001 inches.

As is evident from FIG. 5, the widths of the layers vary. For example, the conductor 210 has a width of 1.620 inches, whereas conductors 221 and 222 have a width of 1.750 inches. Insulating layer 215 has a width of 2.000 inches, insulating layer 225 has a width of 2.250 inches and insulating layer 230 has a width of 2.500 inches.

Figure 6:
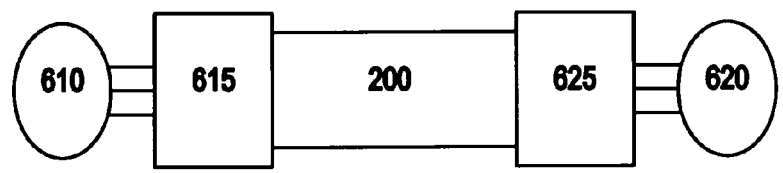
FIG. 6 illustrates a possible termination configurations for the electrical wire 200 according to the exemplary embodiments of the present invention therein.

The electrical wire according to the exemplary aspects of the present invention may include a longitudinal portion formed between two terminal portions. FIG. 6 illustrates possible terminations for the electrical wire 200.

The line side 610 in FIG. 6 is where power originates and the load side 620 is where it is delivered. The line side power may typically originated via a common receptacle or other source (e.g., a conventional source). Termination techniques (e.g., at either end of the wire) can include soldering, crimping, surface contact, clamping and insulation displacement.

With respect to the line side terminations, a male plug placed in the receptacle with a tail of power cord can be terminated within the line side termination box 615. In this case, the box may be mounted on the wall (or ceiling) near the outlet receptacle. Further, the termination box can be a "source module" as a mechanical interface to an active safety device (ASD), which plugs into the outlet. In addition, the termination box can reside over the outlets and plug into an outlet (receptacle).

With respect to the load side terminations, a set of three "flying heads" or conventional wires may be provided for the user to cut-to-length and terminate as needed (e.g., sconce lights, ceiling fans, etc.). Further, a terminal strip mounted on a small printed circuit board that is attached to the wire can provide screw terminals to the user. In addition, the load side termination (destination) box 625 can include outlets of its own for the user to plug.

Another aspect of the wire according to the exemplary aspects of the present invention, is that it may provide a capacitance solution. That is, the capacitance resulting from the Electrifiable conductor which may be in close proximity to the return conductor, may represent a reactive current in superposition with any load current. This capacitance is charged based on the applied voltage (e.g., AC or DC). Since the return conductor has a low voltage relative to the Electrifiable conductor, very little charge will be accumulated within any capacitor formed between the return and grounding conductors.

Figure 7:
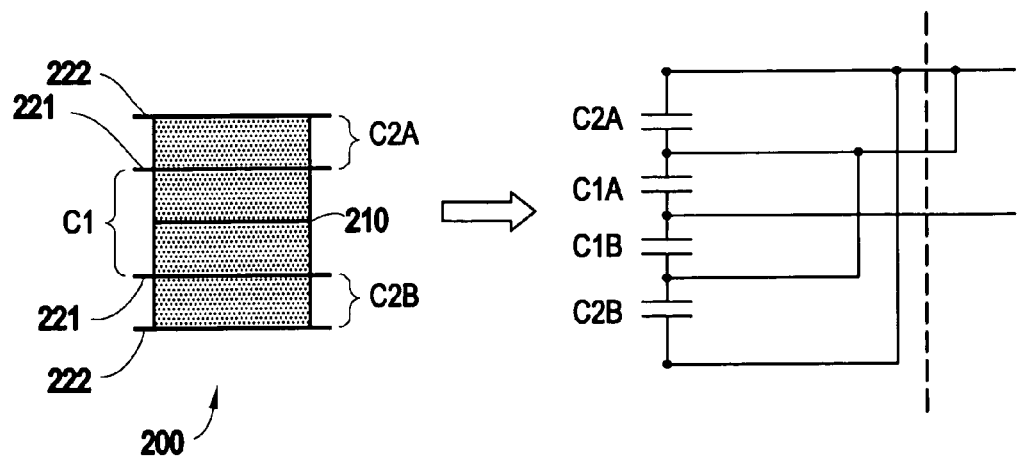
FIG. 7 illustrates an electrical wire that can be considered as forming a series of capacitors with an equivalent capacitive circuit according to the exemplary embodiments of the present invention.

Specifically, the electrical wire (e.g., layered FlatWire) can be considered as forming a series of capacitances (e.g., capacitors) with an equivalent circuit (e.g., capacitive circuit) as illustrated in FIG. 7. As shown in FIG. 7, the electrical wire 200 including an Electrifiable conductor 210, grounding conductors 221 and grounding conductors 222 may form capacitors C1, C2A and C2B.

In this case, capacitor C1 is a parallel plate capacitor formed by the return conductor 221 (e.g., neutral layer(s)) in close proximity to the Electrifiable (e.g., inner (hot)) conductor 210. Capacitor C2 is formed by return (e.g., neutral) conductor 221 and grounding conductor 222 in close proximity.

With respect to the impact of the capacitors C1 and C2, it should be noted that capacitor C1 (C1A/C1B) may cause a current to flow between the Electrifiable conductor (e.g., FlatWire hot) 210 and return conductor (e.g., FlatWire neutral) 221 via the dielectric (and any air that may be present with the absence of adhesive) formed therebetween. Thus, it can be seen that any air that remains trapped between layers after the final fixation (e.g. concealing compound, wallpaper, paint, etc.) of the electrical wire 200 (e.g., FlatWire) may cause a dramatic reduction in capacitance due to air's low dielectric constant ($\in$=1.0). As the longitudinal (e.g., lengthwise) distance of the wire increases, a significant capacitance in the electrical wire 200 (e.g., AC FlatWire) can be created and, therefore, relatively large currents can be produced.

Further, the current from capacitor C1, being on the return (e.g., neutral) conductor 221 and Electrifiable (e.g., hot) conductor 210, represent a balanced load current to H-N CTs (e.g., return current flow minus hot current flow is zero) and therefore are not considered to be a problem regarding line source GFCI false tripping. In case the capacitive current on return and Electrifiable conductors (e.g., neutral and hot) should become a problem, a "cancellation" circuit may be implemented to null out the current.

Further, capacitor C2 (C2A/C2B) will not cause a significant current to flow between the return (e.g., neutral) conductor 221 and Electrifiable (e.g., hot) conductor 210 (e.g., FlatWire neutral and FlatWire Gnd) since the voltage differential is typically less than 1 volt. Further, as noted above, in case the capacitive current on the return and Electrifiable conductors, (e.g., neutral and hot) ever become a problem, a "cancellation" circuit (e.g., a circuit having an inductance) may be implemented to null out the current.

Figure 8:
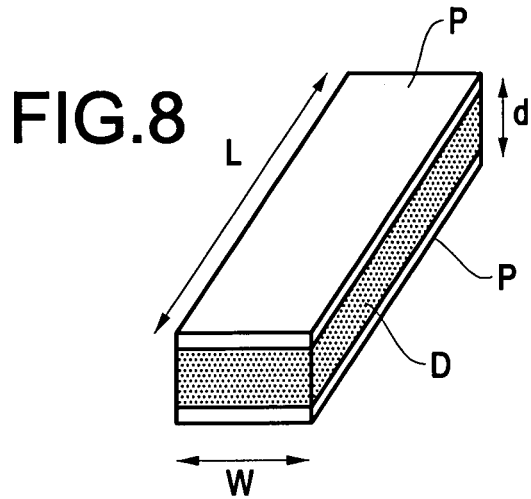
FIGS. 8–10 provide schematic illustrations of a typical two plate capacitor, four plate capacitor and three plate capacitor, respectively, according to the exemplary aspects of the present invention.
Figure 9:
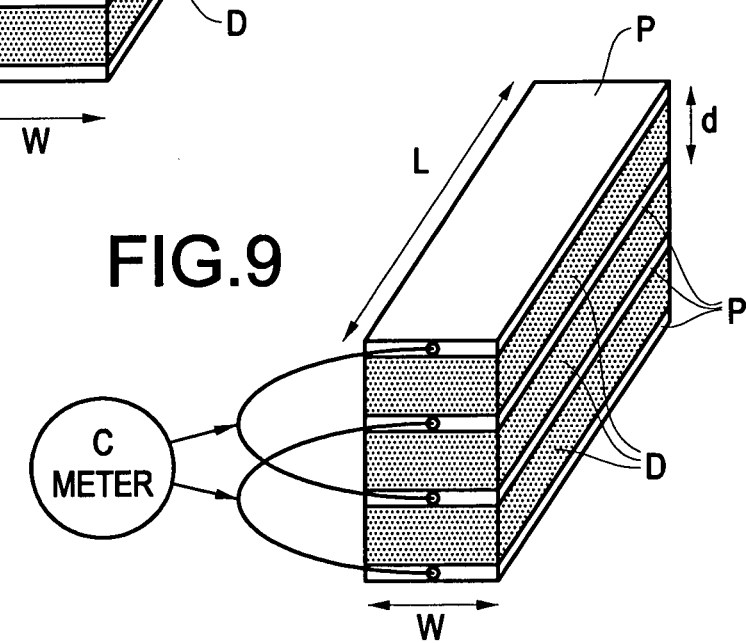
Figure 10:
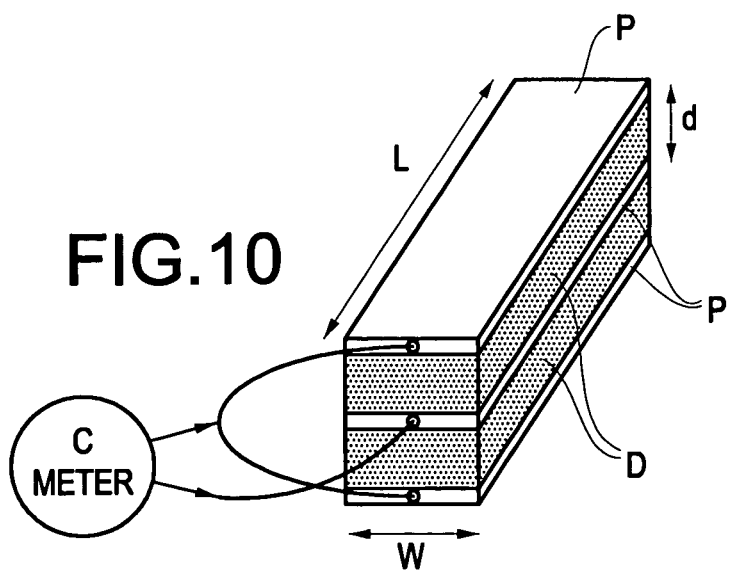

Referring again to the drawings, the capacitance value of the capacitor C1A may actually be derived from a parallel plate capacitor model. FIGS. 8–10 illustrate a typical two plate capacitor, four plate capacitor and three plate capacitor, respectively, where P identifies the capacitor plates, and D identifies the dielectric between the capacitor plates.

The parallel plate capacitance, C, (e.g., as indicated by a capacitance meter, C meter) may be given by $C=\in A/d$, where the dielectric constant of the dielectric, D, between the conductors is given as $\in = \in_O \cdot \in_R$, where A is the area of the plate capacitor, d is the distance between plate surfaces, $\in_O$ is the dielectric constant (e.g., permittivity) of free space, and $\in_R$ is the relative permittivity of the dielectric material.

Thus, as illustrated in FIG. 8, for a two plate capacitor, the area, A, of the parallel plate capacitor is given as $A=L \cdot W$, and where L is the Length of the plate, W is the width of the plate, and as illustrated in FIG. 9, for a four plate capacitor, the area, A, is given as $A=L \cdot W \cdot 2$ FIG. 10 shows the wiring/configuration of a 3-plate capacitor stack that emulates the electrical wire 200 (e.g., electrical FlatWire) with shorted shields relative to each Electrifiable (e.g., inner) conductor. It should be noted that the configuration of FIG. 10 may be derived by eliminating 1 plate (e.g., conductor) and 1 dielectric separator (e.g., insulating layer) from the structure shown in FIG. 9.

Further, as illustrated in FIG. 10, the area A of the plate capacitor is given by $A=W \cdot L \cdot k$, where the plate multiplier constant, k, is actually the number of plates (n) divided by 2. Thus, for a three plate capacitor, the constant k=1.5.

Therefore, for the electrical wire (e.g., stacked electrical FlatWire) the capacitance for the capacitor formed between the Electrifiable conductor and its two adjacent return conductors (e.g., layers), is given as $C=\in(W \cdot L \cdot 1.5)/d$, or $C=1.5 \cdot W \cdot L \cdot \in /d$.

Figure 11:
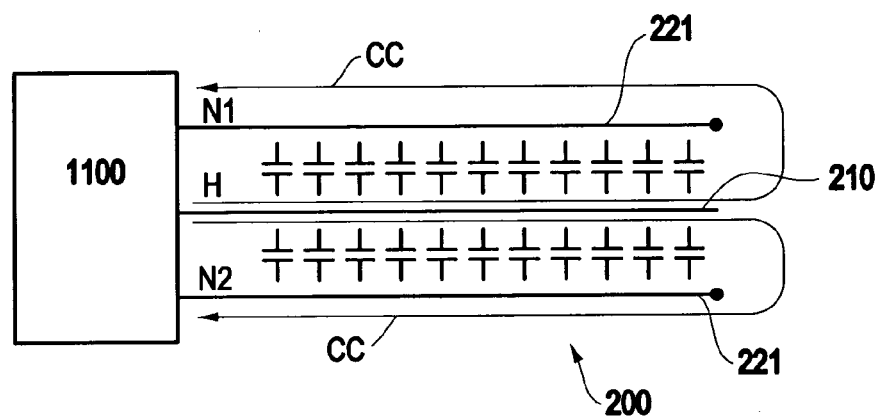
FIGS. 11–12 illustrate how capacitively coupled current may be canceled in the electrical wire, according the exemplary aspects of the present invention.
Figure 12:
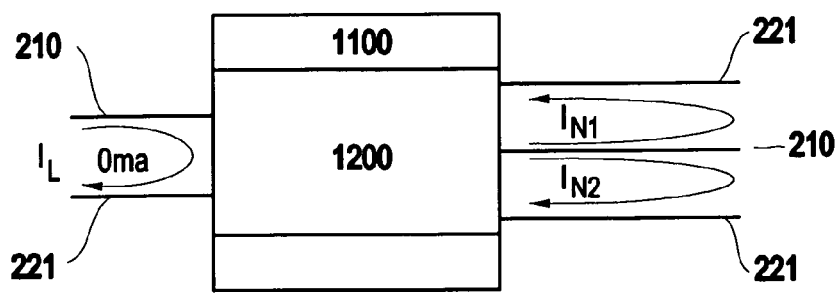

It should be further noted that the capacitance value calculated using the above equation turns out to be worst case since the conductors (e.g., layers) are not necessarily in full contact with each other. Air spaces and gaps where no adhesive is present produce larger values of "d" thus causing smaller values of capacitance. This capacitance may vary based on the percent of surface adhesion between layers and the amount of compressive force that may be applied to the outer surfaces of the electrical wire (e.g., FlatWire) Referring again to the drawings, FIGS. 11–12 illustrate how capacitively coupled current may be canceled in the electrical wire according the exemplary aspects of the present invention. Specifically, FIG. 11 illustrates the case where the electrical wire 200 having an Electrifiable conductor 210 and two return conductors 221, is terminated at an active safety device (ASD) or source module 1100.

In this case, the capacitively coupled current, CC, can be represented as shown in FIG. 11. Since the return conductor (e.g., neutral) is not significantly electrified (e.g., low AC volts) it has little impact on current coupled to the shields. The Electrifiable conductor (e.g., hot) 210 however, is highly electrified and is coupling capacitive currents into the ground conductors 221 (e.g., neutrals) throughout the length of the electrical wire (e.g., flatwire).

FIG. 12 provides a capacitive current cancellation diagram which illustrates how a cancellation circuit might be used to produce a net zero current on the Electrifiable conductor 210 and ground conductors (e.g., hot and neutral conductors) regarding capacitance. As illustrated in FIG. 12, the cancellation circuit 1200 may be included as part of or used in conjunction with an active safety device 1100.

Specifically, the current, IL after application of the cancellation circuit 1200 may be given by $I_L=I_{N1}+I_{N2}-I_C$, where $I_{N1}$ and $I_{N2}$ are the current on the return conductors 221, and $I_C$ is the cancellation current (e.g., provided by the cancellation circuit). For example, $I_L$ may be 0 mA.

Another aspect of the electrical wire according to the exemplary embodiments of the present invention, is a bi-directional nature of the "shielding" capability of the grounding (e.g., outer; earth ground) conductors. For example, as noted above, the at least one grounding layer inhibits power transmission signals and load-generated electrical noise from being transferred/emitted from the electrical wire. In addition, the shielding provided by the grounding conductors prevents ingress of externally generated electrical noise onto either the return or Electrifiable conductors, which is also a valuable feature.

Also in the interest of safety and communications regarding grounding layers, the two or more grounding conductors 222 (e.g., isolated (outer) grounding layers) in the electrical wire (e.g., stacked arrangement) provide an opportunity to send a communication type signal longitudinally to the other end of the grounding conductor 222, through a wired "jumper" at the destination "module" and returned longitudinally to the source. This may be used to provide, for example, a "ground loop continuity check".

Thus, the electrical wire may provide the ability to check for continuity by an "Active Safety Device" prior to electrifying the Electrifiable conductor or segments of the Electrifiable conductor. One practical application for this feature is for providing safety while an electrician terminates exposed destination ends of the electrical wire.

Figure 13:
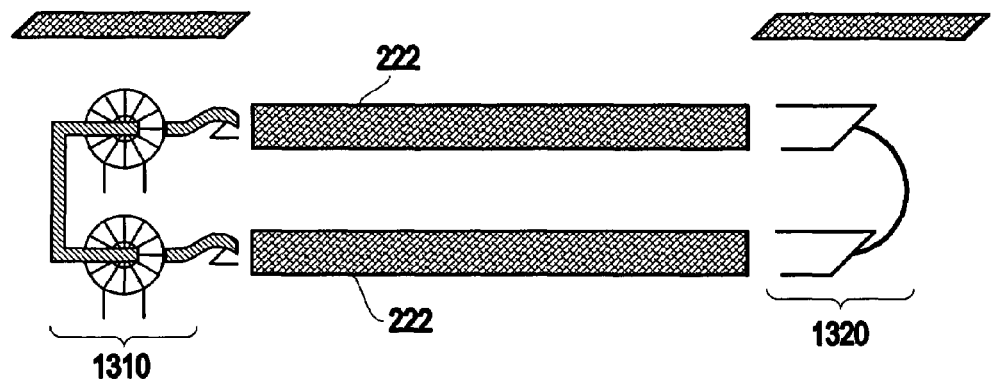
FIG. 13 provides a schematic diagram of an exemplary configuration for detecting ground loop continuity using the electrical wire, according to the exemplary aspects of the present invention.

FIG. 13 provides an schematic diagram of an exemplary configuration for detecting ground loop continuity using the electrical wire. As illustrated in FIG. 13, the grounding conductor 222 and opposing grounding conductor 222 may be considered as part of a closed loop between a source 1310 and destination 1320.

The wire may also accommodate additional communication tasks such as providing a transmitting current transformer (CT) and a sensing current transformer (CT). A periodic signal, which may be (e.g., preferably) greater than AC line frequency, may be injected onto one of the grounding conductors 222 while the opposed grounding conductor 222 is sensed for signal return via the sensing CT.

Figure 14:
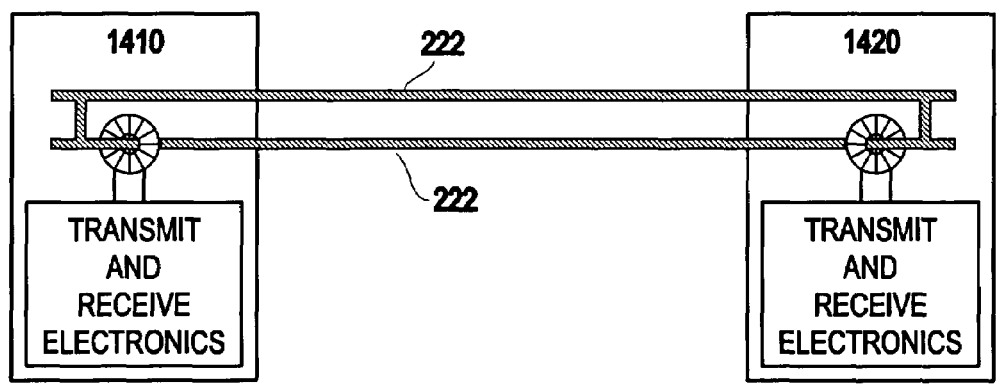
FIG. 14 provides a conceptual illustration for providing split ground signaling, according to the exemplary aspects of the present invention.

FIG. 14 provides a conceptual illustration for providing split ground signaling where the electrical wire is disposed between a source module (e.g., current tap) 1410 and a destination module 1420, which may transmit and receive electrical signals processed by transmit and receive electronics. The two or more return conductors 222 (e.g., isolated (outer) grounding layers in the stacked or lateral (planar) arrangement) can be further split or separated transversely to provide an opportunity to send a communication type signal longitudinally and differentially between the split conductors.

Figure 15:
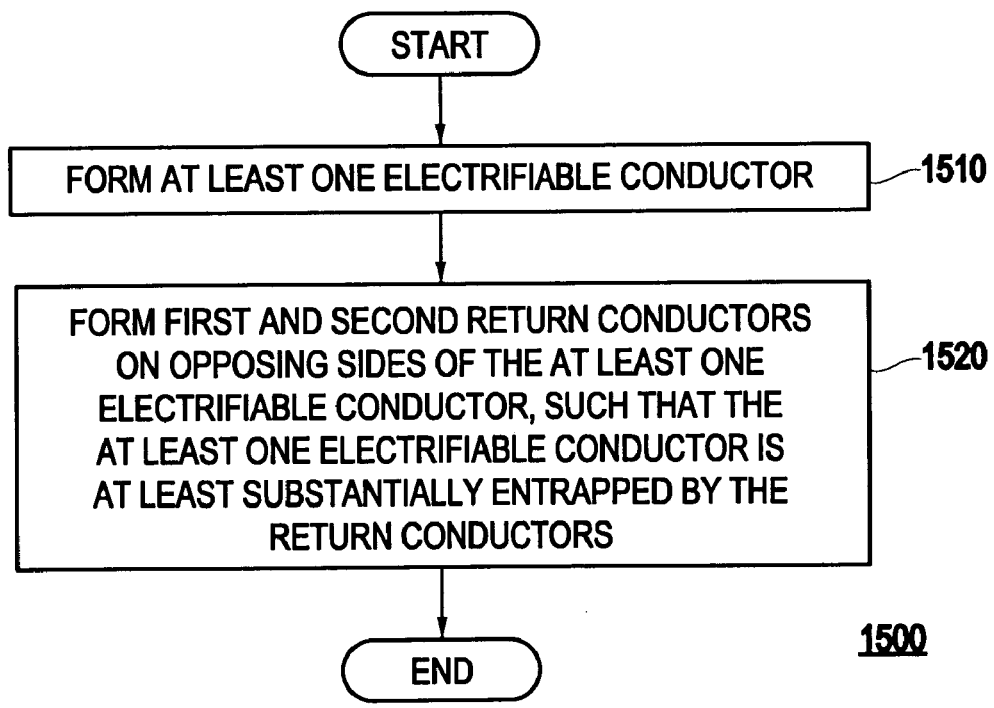
FIG. 15 illustrates a method 1500 of fabricating an electrical wire according to the exemplary aspects of the present invention.

Referring again to the drawings, FIG. 15 illustrates a method 1500 of fabricating an electrical wire according to the exemplary aspects of the present invention. The method 1500 includes forming (1510) at least one electrifiable conductor, forming (1520) a pair of return conductors on opposing sides of the at least one electrifiable conductor, such that the at least one electrifiable conductor is at least substantially entrapped by the return conductors.

Specifically, the conductors in the electrical wire (e.g., the Electrifiable, return and grounding conductors) may be formed of a substantially conductive medium, and may include, for example, copper, aluminum, steel, silver, gold, platinum, nickel, tin, graphite, silicon, an alloy including any of these, conductive gas, metal, alloy metal. That is, the conductors may include any material that is able to transfer electrons regardless of efficiency in doing so. This is true as long as the relative ability to transfer electrons in the "conductors" is substantially better than the "insulators".

Further, the insulating layers may be formed of substantially non-conductive mediums ("insulators"), and may include, for example, a material that is organic, inorganic, composite, metallic, carbonic, homogeneous, heterogeneous, thermoplastic (e.g. poly-olefin, polyester, polypropylene, polyvinyl chloride (PVC)), thermoset, wood, paper, anodic formation, corrosive layer, or other.

The insulating layers can be made of any material that is ratiometrically less (e.g., proportionally less) able to conduct electricity than the conductors. A distinguishing feature of the insulating layers (which determines the implied ratio), is that their size, shape, and dielectric strength are independent variables whose resulting dependant variable is the maximum design voltage, between the aforementioned "conductors", before substantial current flows through the insulating medium due to a break-down of its insulating properties.

The substantial current typically creates a condition that could result in catastrophic failure of the electrical wire. The insulating layers should be designed such that in the typical application or intended use of the electrical wire, there is no break-down between the conductors (e.g., substantially conductive mediums), through the insulating layers (e.g., substantially non-conductive mediums).

The electrical wire may be formed by layering (e.g., laminating) the conductors and insulating layers (e.g., substantially conductive and substantially non-conductive mediums (e.g., laminates). Further, laminates including pre-manufactured materials facilitate bulk rolling.

Most electrical wires are made by wrapping flat insulators around the axis of a round wire bundle in the form of a helix. Also most individual wires are insulated by having a plastic PVC sheath extruded around the round wire.

The electrical wire according to the exemplary aspects of the present invention, however, may include a rolled sheet or foil that is slit to the desired widths. The same is true of the insulating material. Those conductors and insulators which are processed by rolling techniques may then coated with adhesives that allow the dissimilar materials to be bonded to one another in a continuous feed process. The slitting may occur before the bonding of the dissimilar materials or after, depending on the geometric configuration. For example, in one preferred embodiment of the present invention, the insulators and conductors are slit before bonding materials together.

Figure 16:
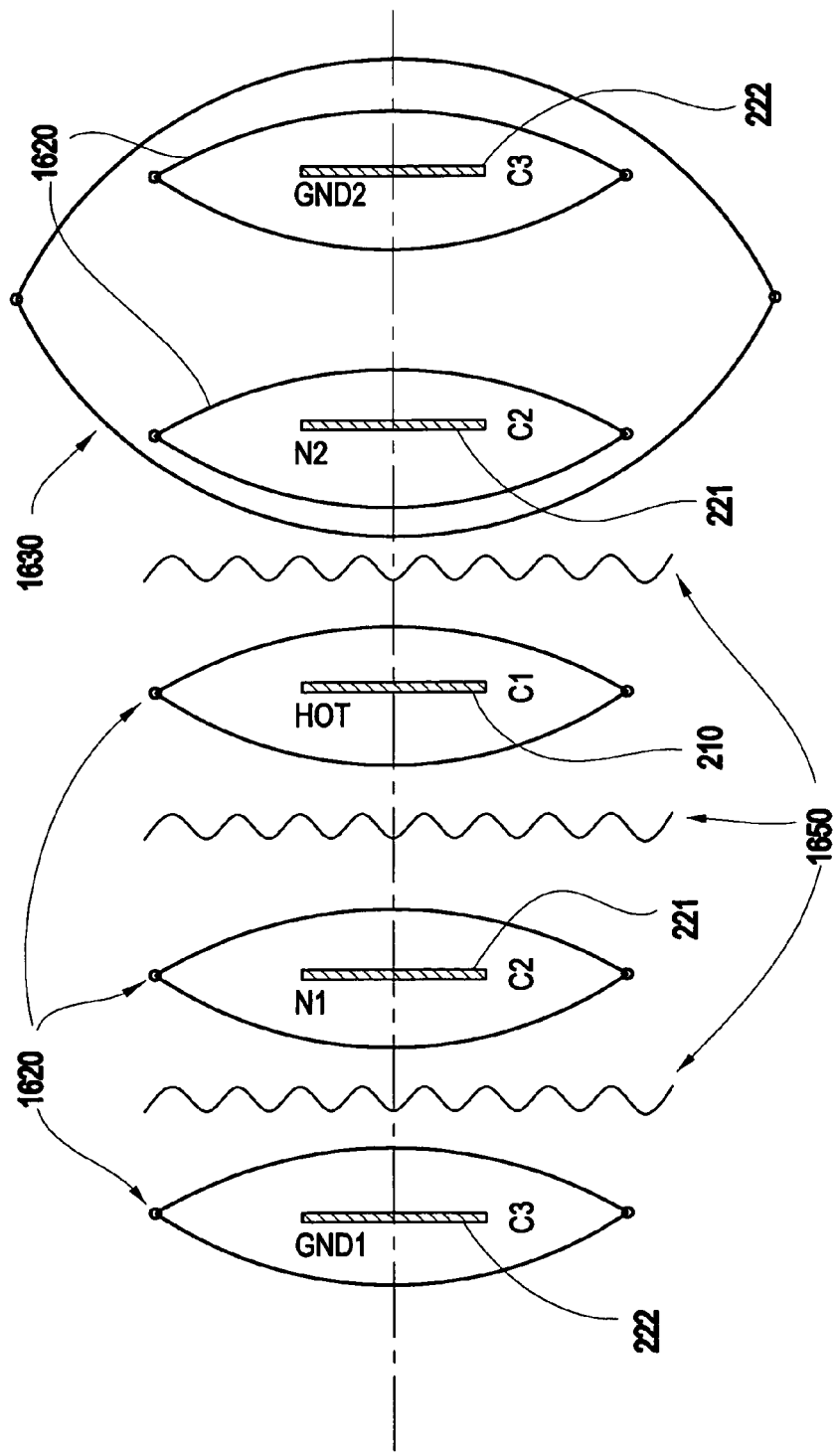
FIGS. 16–17 provide exemplary configurations of the electrical wire 200 according to the exemplary aspects of the present invention.

Further, as illustrated in FIG. 16, the conductors 210, 221, 222 may be sealed or encapsulated by insulation layers (e.g., individual insulation 1620 and/or group insulation 1630) and adhesive 1650 may be formed between the insulation layers 1620, 1630. The insulators are bonded to the conductors, and overlap the transverse width of the conductors such that insulators may be bonded to insulators. The mutual bonding between insulator materials creates a much stronger and permanent bond, further encapsulating the conductor around the entire cross-sectional periphery.

Any number of insulators may exist between conductors. Insulators for individual conductors may end up, beside one another (back to back). Or there can exist a multi-layer combination of insulators for purposes typically having to do with the connectorization requirements.

Figure 17:
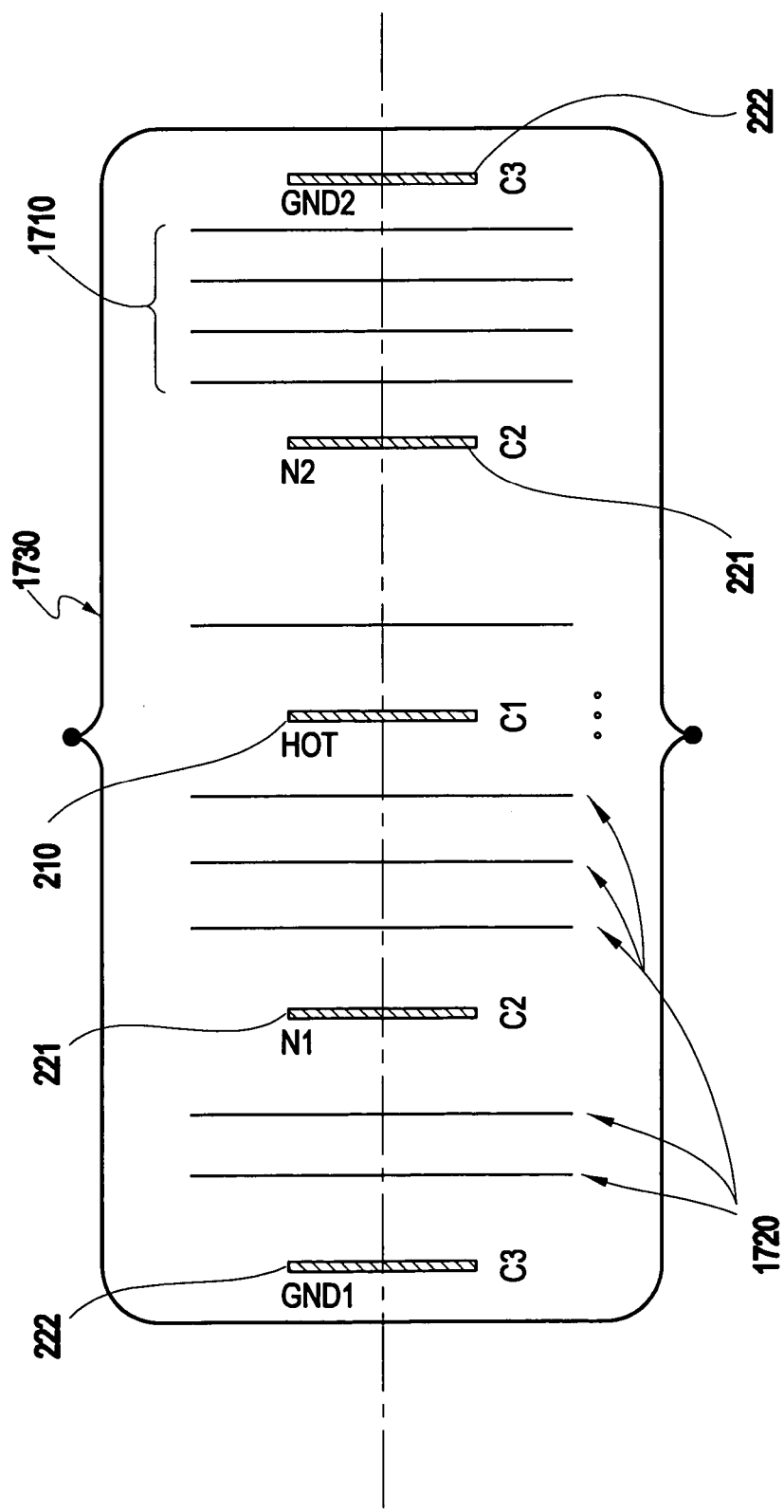

In addition, as illustrated in FIG. 17, multiple insulator groups 1710 (e.g., insulating laminates) which are formed of groups of individual insulators 1720 may be placed between any two conductors 210, 221, 222. A layer of group insulation 1730 may also be formed around the structure including the insulator groups 1710 and conductors 210, 221, 222.

When layers of conductors are separated by a layer of insulating material, the possibility exists that a defect in the insulating material is present. One such defect, in the case of laminates, is an opening (e.g., a pin hole opening) in the insulating material. The opening prevents the intended insulation from occurring and can result in a conductive path in the area of the laminate opening. By placing two laminates or two sheets or two ribbons, (whatever the name for the substantially flat insulating layers), between any two conductors, the statistical likelihood of positioning two openings (e.g., defects) in a coincident position is substantially minimized.

The individually insulated conductors (e.g., as illustrated in FIGS. 16 and 17) may be formed by placing insulating materials in substantially parallel planes with the conductors, and then bonding the insulating materials to the conductor for fixation. Conductors may be grouped together by group insulation 1630, 1730. The individually insulated conductors may be joined by possible adhesive 1650 or alternate methods of conjoining. This allows the present invention to provide for an insulated wire whose adhesive or layered configuration allows for the peeling and folding of individual conductors for purposes of termination.

With its unique and novel features, the present invention provides an electrical wire and method of fabricating the electrical wire that when externally damaged, has a reduced risk of contributing to bodily harm or damage, or property (e.g., structural) damage, over conventional electrical wire.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. An electrical wire comprising:
   at least one electrifiable conductor for delivering electrical power; and
   first and second return conductors which are respectively formed on opposing sides of said at least one electrifiable conductor, such that said at least one electrifiable conductor is at least substantially entrapped by said first and second return conductors;
   wherein a distance between said at least one electrifiable conductor and each of said first and second return conductors is no greater than approximately 0.030 inches.

2. The electrical wire according to claim 1, further comprising:
   first and second insulating layers which are formed between said at least one electrifiable conductor and said first and second return conductors, respectively.

3. The electrical wire according to claim 2, wherein said first and second insulating layers, contact each other along a longitudinal edge of said electrical wire.

4. The electrical wire according to claim 3, wherein said first and second insulating layers are treated by at least one of a mechanical, chemical and thermal treatment to form a protective longitudinal edge of said electrical wire, said protective edge inhibiting a foreign object from penetrating said electrical wire and contacting said at least one Electrifiable conductor.

5. The electrical wire according to claim 2, further comprising:
   an outer insulating layer formed on said first and second return conductors.

6. The electrical wire according to claim 1, wherein said at least one electrifiable conductor and said first and second return conductors comprise substantially flat conductive layers having a stacked arrangement.

7. The electrical wire according to claim 1, wherein said first and second return conductors contact each other along a longitudinal edge of said electrical wire, such that said electrifiable conductor is completely entrapped by said first and second return conductors.

8. The electrical wire according to claim 1, wherein said first and second return conductors are treated by at least one of a mechanical, chemical and thermal treatment to form a protective longitudinal edge of said electrical wire, said protective edge inhibiting a foreign object from penetrating said electrical wire and contacting said Electrifiable conductor without contacting one of said first and second return conductors.

9. An electrical current delivery system comprising the electrical wire of claim 1.

10. An electrical signal transmission system comprising the electrical wire of claim 1.

11. The electrical wire according to claim 1, wherein each of said first and second return conductors substantially surround a periphery of said at least one electrifiable conductor.

12. The electrical wire according to claim 1, wherein said electrifiable conductor comprises a power delivery conductor for delivering electrical current to a load.

13. The electrical wire according to claim 12, wherein at least one of said return conductors comprises a conductor for carrying a current away from said load.

14. The electrical wire according to claim 1, wherein said electrical wire comprises AC electrical wire for delivering AC electrical power.

15. The electrical wire according to claim 1, wherein said electrical wire comprises one of 120V AC electrical wire and 240V AC electrical wire.

16. The electrical wire according to claim 1, wherein said at least one electrifiable conductor comprises a cross-sectional area which is substantially equal to a cross-sectional area of at least one of said first and second return conductors.

17. The electrical wire according to claim 1, wherein said electrifiable conductor comprises a thickness which is in a range from about 0.0004 inches to about 0.020 inches.

18. The electrical wire according to claim 1, wherein a total thickness of the electrical wire is no more than approximately 0.050 inches.

19. An electrical wire comprising:
  at least one electrifiable conductor for delivering electrical power;
  first and second insulating layers formed on opposing sides of said at least one electrifiable conductor;
  first and second return conductors formed on said first and second insulating layers, respectively, such that said at least one electrifiable conductor is at least substantially entrapped by said first and second return conductors;
  third and fourth insulating layers formed on said first and second return conductors, respectively;
  first and second grounding conductors formed on said third and fourth insulating layers, respectively; and
  fifth and sixth insulating layers formed on said first and second grounding conductors, respectively;
  wherein a distance between said at least one electrifiable conductor and each of said first and second return conductors is no greater than approximately 0.030 inches.

20. The electrical wire according to claim 19, wherein said first and second return conductors are treated by at least one of a mechanical, chemical and thermal treatment to form a protective longitudinal edge of said electrical wire, said protective edge inhibiting a foreign object from penetrating said electrical wire and contacting said Electrifiable conductor without contacting one of said first and second return conductors.

21. The electrical wire according to claim 19, wherein an area between said first and second return conductors forms a hot zone, said at least one electrifiable conductor being disposed within said hot zone.

22. The electrical wire according to claim 21, wherein said at least one Electrifiable conductor comprises a plurality of Electrifiable conductors which are formed in said hot zone and comprise a plurality of horizontal segments across a width of said wire and a plurality of vertical segments across a thickness of said wire.

23. The electrical wire according to claim 22, wherein at least one segment in said plurality of horizontal segments of said Electrifiable conductors is used to transmit a communication signal, and
  wherein at least one segment in said plurality of horizontal segments of said Electrifiable conductors is used to supply one of AC and DC electrical power.

24. The electrical wire according to claim 23, wherein said communication signal comprises one of a voice communication signal and a data communication signal.

25. The electrical wire according to claim 19, wherein a capacitance formed between said at least one Electrifiable conductor and said first and second return conductors is given as C=1.5·W·L·∈/d, where W is the width of the return and electrifiable conductors, L is the length of the return and electrifiable conductors, ∈ is the dielectric constant for the first and second insulating layers, and d is the distance between each of the return and electrifiable conductors.

26. The electrical wire according to claim 19, further comprising:
  an adhesive for bonding adjacent insulation layers and conductors in said electrical wire.

27. The electrical wire according to claim 19, wherein an object penetrating an outer surface of said electrical wire contacts one of said first and second grounding conductors and one of said first and second return conductors, before contacting said at least one Electrifiable conductor.

28. The electrical wire according to claim 19, wherein said first and second grounding conductors inhibit power transmission signals and load-generated electrical noise from being emitted from said electrical wire.

29. The electrical wire according to claim 19, wherein said first and second return conductors and said first and second grounding conductors comprise a rate of heat dissipation which is greater than a rate of heat dissipation for an round conductor, for a given cross-sectional area.

30. The electrical wire according to claim 19, wherein said electrical wire comprises one of alternating current (AC) electrical wire and direct current (DC) electrical wire for supplying an electrical current having potential of greater than 0V.

31. The electrical wire according to claim 19, wherein said electrical wire comprises surface-mountable electrical wire.

32. The electrical wire according to claim 19, wherein said first and second return conductors each have a thickness $T_G$, and said first and second grounding conductors each have a thickness $T_N$, and said Electrifiable conductor has a thickness $T_H$, such that a ratio of thicknesses $R=(T_G+T_N)/T_H$ is at least 1.00.

33. The electrical wire according to claim 19, wherein a total thickness of the electrical wire is no more than approximately 0.050 inches.

34. An electrical wire comprising:
  at least one electrifiable conductor for delivering electrical power;
  a first insulating layer formed around said at least one electrifiable conductor;
  a return conductor formed around said first insulating layer, such that said at least one electrifiable conductor is at least substantially entrapped by said return conductor; and
  a second insulating layer formed around said return conductor;
  wherein a distance between said at least one electrifiable conductor and said return conductor is no greater than approximately 0.030 inches.

35. The electrical wire according to claim 34, further comprising:
  a grounding conductor formed around said second insulating layer; and
  a third insulating layer formed around said grounding conductor.

36. The electrical wire according to claim 34, wherein said at least one electrifiable conductor, said return conductor and said grounding conductor comprise one of substantially curvilinear-shaped cross-sectional geometries and substantially rectilinear cross-sectional geometries.

37. The electrical wire according to claim 34, wherein said electrifiable conductor, said return conductor and said grounding conductor are formed in substantially parallel planes.

38. The electrical wire according to claim 34, wherein said electrical wire comprises a substantially flat electrical wire having a total thickness of no more than about 0.050 inches.

39. The electrical wire according to claim 34 wherein said electrifiable conductor, said return conductor and said grounding conductor comprise substantially oval-shaped conductors.

40. A method of fabricating an electrical wire, comprising:
  forming at least one electrifiable conductor for delivering electrical power; and forming first and second return conductors on opposing sides of said at least one electrifiable conductor, such that said at least one electrifiable conductor is at least substantially entrapped by said return conductors;

wherein a distance between said at least one electrifiable conductor and each of said first and second return conductors is no greater than approximately 0.030 inches.

41. An electrical wire comprising:

at least one electrifiable conductor for delivering electrical power; and first and second return conductors which are respectively formed on opposing sides of said at least one electrifiable conductor, such that said at least one electrifiable conductor is at least substantially entrapped by said first and second return conductors;

wherein a total thickness of the electrical wire is no more than approximately 0.050 inches.

42. The electrical wire according to claim 41, further comprising:

first and second insulating layers which are formed between said at least one electrifiable conductor and said first and second return conductors, respectively.

43. The electrical wire according to claim 42, wherein said first and second insulating layers, contact each other along a longitudinal edge of said electrical wire.

44. The electrical wire according to claim 43, wherein said first and second insulating layers are treated by at least one of a mechanical, chemical and thermal treatment to form a protective longitudinal edge of said electrical wire, said protective edge inhibiting a foreign object from penetrating said electrical wire and contacting said at least one Electrifiable conductor.

45. The electrical wire according to claim 41, wherein said at least one electrifiable conductor and said first and second return conductors comprise substantially flat conductive layers having a stacked arrangement.

46. The electrical wire according to claim 41, wherein said first and second return conductors contact each other along a longitudinal edge of said electrical wire, such that said electrifiable conductor is completely entrapped by said first and second return conductors.

47. The electrical wire according to claim 41, wherein said first and second return conductors are treated by at least one of a mechanical, chemical and thermal treatment to form a protective longitudinal edge of said electrical wire, said protective edge inhibiting a foreign object from penetrating said electrical wire and contacting said Electrifiable conductor without contacting one of said first and second return conductors.

48. The electrical wire according to claim 41, wherein a distance between said at least one electrifiable conductor and each of said first and second return conductors is no greater than approximately 0.030 inches.

49. An electrical current delivery system comprising the electrical wire of claim 41.

50. An electrical signal transmission system comprising the electrical wire of claim 41.

51. The electrical wire according to claim 41, wherein each of said first and second return conductors substantially surround a periphery of said at least one electrifiable conductor.

52. The electrical wire according to claim 41, wherein said electrifiable conductor comprises a power delivery conductor for delivering electrical current to a load.

53. The electrical wire according to claim 52, wherein at least one of said return conductors comprises a conductor for carrying a current away from said load.

54. The electrical wire according to claim 41, wherein said electrical wire comprises AC electrical wire for delivering AC electrical power.

55. The electrical wire according to claim 41, wherein said electrical wire comprises one of 120V AC electrical wire and 240V AC electrical wire.

56. The electrical wire according to claim 41, wherein said at least one electrifiable conductor comprises a cross-sectional area which is substantially equal to a cross-sectional area of at least one of said first and second return conductors.

57. The electrical wire according to claim 41, wherein said electrifiable conductor comprises a thickness which is in a range from about 0.0004 inches to about 0.020 inches.

58. An electrical wire comprising:

at least one electrifiable conductor for delivering electrical power;

first and second insulating layers formed on opposing sides of said at least one electrifiable conductor;

first and second return conductors formed on said first and second insulating layers, respectively, such that said at least one electrifiable conductor is at least substantially entrapped by said first and second return conductors;

third and fourth insulating layers formed on said first and second return conductors, respectively;

first and second grounding conductors formed on said third and fourth insulating layers, respectively; and fifth and sixth insulating layers formed on said first and second grounding conductors, respectively;

wherein a total thickness of the electrical wire is no more than approximately 0.050 inches.

59. The electrical wire according to claim 58, further comprising:

an outer insulating layer formed on said first and second return conductors.

60. The electrical wire according to claim 58, wherein said first and second return conductors are treated by at least one of a mechanical, chemical and thermal treatment to form a protective longitudinal edge of said electrical wire, said protective edge inhibiting a foreign object from penetrating said electrical wire and contacting said Electrifiable conductor without contacting one of said first and second return conductors.

61. The electrical wire according to claim 58, wherein an area between said first and second return conductors forms a hot zone, said at least one electrifiable conductor being disposed within said hot zone.

62. The electrical wire according to claim 61, wherein said at least one Electrifiable conductor comprises a plurality of Electrifiable conductors which are formed in said hot zone and comprise a plurality of horizontal segments across a width of said wire and a plurality of vertical segments across a thickness of said wire.

63. The electrical wire according to claim 62, wherein at least one segment in said plurality of horizontal segments of said Electrifiable conductors is used to transmit a communication signal, and wherein at least one segment in said plurality of horizontal segments of said Electrifiable conductors is used to supply one of AC and DC electrical power.

64. The electrical wire according to claim 63, wherein said communication signal comprises one of a voice communication signal and a data communication signal.

65. The electrical wire according to claim 58, wherein a capacitance formed between said at least one Electrifiable conductor and said first and second return conductors is given as $C=1.5 \cdot W \cdot L \cdot \epsilon/d$, where W is the width of the return and electrifiable conductors, L is the length of the return and electrifiable conductors, $\epsilon$ is the dielectric constant for the first and second insulating layers, and d is the distance between each of the return and electrifiable conductors.

66. The electrical wire according to claim 58, further comprising:
an adhesive for bonding adjacent insulation layers and conductors in said electrical wire.

67. The electrical wire according to claim 58, wherein an object penetrating an outer surface of said electrical wire contacts one of said first and second grounding conductors and one of said first and second return conductors, before contacting said at least one Electrifiable conductor.

68. The electrical wire according to claim 58, wherein said first and second grounding conductors inhibit power transmission signals and load-generated electrical noise from being emitted from said electrical wire.

69. The electrical wire according to claim 58, wherein said first and second return conductors and said first and second grounding conductors comprise a rate of heat dissipation which is greater than a rate of heat dissipation for an round conductor, for a given cross-sectional area.

70. The electrical wire according to claim 58, wherein said electrical wire comprises one of alternating current (AC) electrical wire and direct current (DC) electrical wire for supplying an electrical current having potential of greater than 0V.

71. The electrical wire according to claim 58, wherein said electrical wire comprises surface-mountable electrical wire.

72. The electrical wire according to claim 58, wherein said first and second return conductors each have a thickness $T_G$, and said first and second grounding conductors each have a thickness $T_N$, and said Electrifiable conductor has a thickness $T_H$, such that a ratio of thicknesses $R=(T_G+T_N)/T_H$ is at least 1.00.

73. The electrical wire according to claim 58, wherein a distance between said at least one electrifiable conductor and each of said first and second return conductors is no greater than approximately 0.030 inches.

* * * * *

UNITED STATES PATENT AND TRADEMARK OFFICE
CERTIFICATE OF CORRECTION

| | |
|---|---|
| PATENT NO. | : 7,145,073 B2 |
| APPLICATION NO. | : 10/790055 |
| DATED | : December 5, 2005 |
| INVENTOR(S) | : Sexton et al. |

It is certified that error appears in the above-identified patent and that said Letters Patent is hereby corrected as shown below:

Title Page, Item (73) Assignee:

"Southwire Company, Carrolton, GA" should be changed to -- NeWire, Inc., Hendersonville, TN --

Signed and Sealed this

Twenty-seventh Day of November, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,145,073 B2 | Page 1 of 1 |
| APPLICATION NO. | : 10/790055 | |
| DATED | : December 5, 2006 | |
| INVENTOR(S) | : Sexton et al. | |

It is certified that error appears in the above-identified patent and that said Letters Patent is hereby corrected as shown below:

Title Page, Item (73) Assignee:

"Southwire Company, Carrolton, GA" should be changed to -- NeWire, Inc.,

Hendersonville, TN --

This certificate supersedes Certificate of Correction issued November 27, 2007.

Signed and Sealed this

Twenty-fifth Day of December, 2007

JON W. DUDAS
*Director of the United States Patent and Trademark Office*